United States Patent
Liao et al.

(10) Patent No.: US 9,435,985 B2
(45) Date of Patent: Sep. 6, 2016

(54) OPTICAL IMAGING SYSTEM, IMAGE CAPTURING UNIT AND ELECTRONIC DEVICE

(71) Applicant: LARGAN Precision Co., Ltd., Taichung (TW)

(72) Inventors: Lin-Yao Liao, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/671,580

(22) Filed: Mar. 27, 2015

(65) Prior Publication Data
US 2016/0209626 A1 Jul. 21, 2016

(30) Foreign Application Priority Data
Jan. 16, 2015 (TW) .............................. 104101569 A

(51) Int. Cl.
| | | |
|---|---|---|
| G02B 13/04 | (2006.01) | |
| G02B 9/60 | (2006.01) | |
| G02B 13/00 | (2006.01) | |
| H04N 5/232 | (2006.01) | |

(52) U.S. Cl.
CPC ............. *G02B 13/0045* (2013.01); *G02B 9/60* (2013.01); *H04N 5/232* (2013.01)

(58) Field of Classification Search
CPC ..... G02B 13/0045; G02B 13/18; G02B 9/60
USPC ......................... 359/713, 714, 763, 764, 765
See application file for complete search history.

(56) References Cited

U.S. PATENT DOCUMENTS

| | | |
|---|---|---|
| 7,443,610 B1 | 10/2008 | Lin et al. |
| 8,477,432 B2 | 7/2013 | Huang et al. |
| 8,537,472 B2 | 9/2013 | Tsai et al. |
| 8,908,288 B2 | 12/2014 | Hsu et al. |
| 2013/0321932 A1* | 12/2013 | Hsu .................... G02B 13/0045 359/714 |
| 2016/0065811 A1 | 3/2016 | Jo |
| 2016/0065812 A1 | 3/2016 | Jo |

FOREIGN PATENT DOCUMENTS

| | | |
|---|---|---|
| CN | 103777326 A | 5/2014 |
| TW | 201447353 | 12/2014 |
| WO | 2016003211 A1 | 1/2016 |

* cited by examiner

*Primary Examiner* — Scott J Sugarman
(74) *Attorney, Agent, or Firm* — Locke Lord LLP; Tim Tingkang Xia, Esq.

(57) ABSTRACT

An optical imaging system includes, in order from an object side to an image side, a first lens element, a second lens element, a third lens element, a fourth lens element and a fifth lens element. The first lens element with refractive power has an object-side surface being convex in a paraxial region. The second lens element with positive refractive power has an image-side surface being convex in a paraxial region. The third lens element with negative refractive power has an object-side surface being concave in a paraxial region. The fourth lens element with positive refractive power has an object-side surface being concave and an image-side surface being convex in a paraxial region. The fifth lens element with negative refractive power has an image-side surface being concave in a paraxial region, wherein the image-side surface thereof has at least one convex shape in an off-axis region.

39 Claims, 19 Drawing Sheets

OPTICAL IMAGING SYSTEM, IMAGE CAPTURING UNIT AND ELECTRONIC DEVICE

RELATED APPLICATIONS

This application claims priority to Taiwan Application 104101569, filed Jan. 16, 2015, which is incorporated by reference herein in its entirety.

BACKGROUND

1. Technical Field

The present disclosure relates to an optical imaging system, an image capturing unit and an electronic device, more particularly to an optical imaging system and an image capturing unit applicable to an electronic device.

2. Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

With the popularity of the mobile terminals, the demand for the optical system and the requirement for high specification increase gradually. Other conventional compact optical systems with five-element lens structure are developed to enhance resolution and image quality. However, the conventional optical system is unable to satisfy the requirements for large field of view and compact size simultaneously. Furthermore, the refractive power is overloaded on a single lens element so that it is unfavorable for the molding manufacturing.

SUMMARY

According to one aspect of the present disclosure, an optical imaging system includes, in order from an object side to an image side, a first lens element, a second lens element, a third lens element, a fourth lens element and a fifth lens element. The first lens element with refractive power has an object-side surface being convex in a paraxial region thereof. The second lens element with positive refractive power has an image-side surface being convex in a paraxial region thereof, wherein at least one of an object-side surface and the image-side surface of the second lens element is aspheric. The third lens element with negative refractive power has an object-side surface being concave in a paraxial region thereof, wherein at least one of the object-side surface and an image-side surface of the third lens element is aspheric. The fourth lens element with positive refractive power has an object-side surface being concave in a paraxial region thereof and an image-side surface being convex in a paraxial region thereof, wherein at least one of the object-side surface and the image-side surface of the fourth lens element is aspheric. The fifth lens element with negative refractive power has an image-side surface being concave in a paraxial region thereof, wherein the image-side surface of the fifth lens element has at least one convex shape in an off-axis region thereof, and both of an object-side surface and the image-side surface of the fifth lens element are aspheric. The optical imaging system has a total of five lens elements with refractive power. When an axial distance between the first lens element and the second lens element is T12, a central thickness of the second lens element is CT2, a central thickness of the fourth lens element is CT4, a central thickness of the fifth lens element is CT5, a curvature radius of the object-side surface of the third lens element is R5, a curvature radius of the image-side surface of the third lens element is R6, a focal length of the first lens element is f1, a focal length of the second lens element is f2, the following conditions are satisfied:

$1.05 < T12/CT2;$ $1.30 < CT4/CT5;$ $(R5+R6)/(R5-R6) < -0.25;$ and $|f2/f1| < 0.80.$ According to another aspect of the present disclosure, an image capturing unit includes an image sensor and the aforementioned optical imaging system, wherein the image sensor is disposed on the image side of the optical imaging system.

According to still another aspect of the present disclosure, an electronic device includes the aforementioned image capturing unit.

BRIEF DESCRIPTION OF THE DRAWINGS

The disclosure can be more fully understood by reading the following detailed description of the embodiments, with reference made to the accompanying drawings as follows.

DETAILED DESCRIPTION

An optical imaging system includes, in order from an object side to an image side, a first lens element, a second lens element, a third lens element, a fourth lens element and a fifth lens element. The optical imaging system has a total of five lens elements with refractive power.

The first lens element can have positive refractive power. The first lens element has an object-side surface being convex in a paraxial region thereof. The first lens element can have an image-side surface being concave in a paraxial region thereof. Therefore, the first lens element provides the optical imaging system with sufficient positive refractive power. Furthermore, it is favorable for adjusting a total track length of the optical imaging system.

The second lens element with positive refractive power has an image-side surface being convex in a paraxial region thereof. An object-side surface of the second lens element can have at least one concave shape in an off-axis region thereof. Therefore, the first lens element and the second lens element having positive refractive power are favorable for avoiding overloading the positive refractive power on the lens element close to the object side so as to reduce the sensitivity of the optical imaging system and correct the aberration of the off-axis field. Furthermore, it is favorable for reducing a back focal length of the optical imaging system so as to keep the optical imaging system compact.

Figure 17:
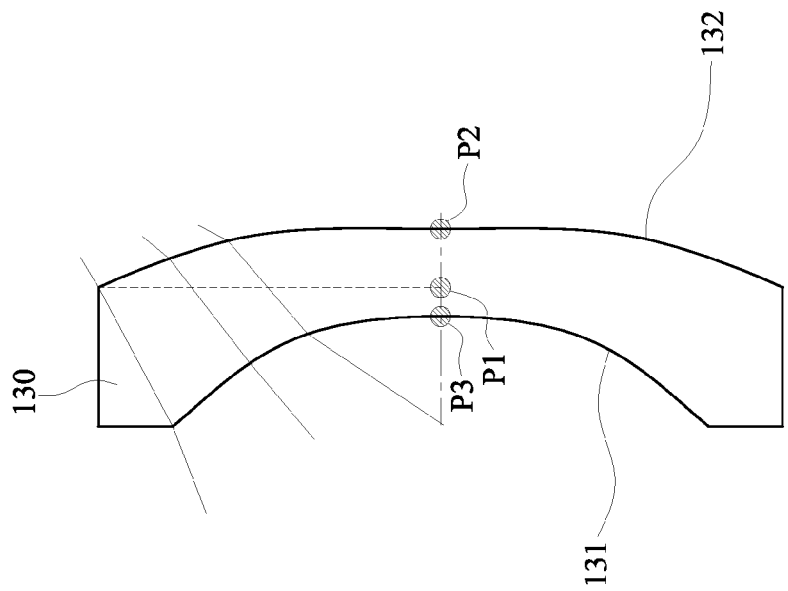
FIG. 17 is a schematic view of P1, P2 and P3 in FIG. 1.

The third lens element with negative refractive power has an object-side surface being concave in a paraxial region thereof. Therefore, it is favorable for correcting the aberration from the first lens element and the second lens element. In some embodiments, A projection P1 on an optical axis from a position of a maximum effective radius of an image-side surface of the third lens element is closer to the object side of the optical imaging system than a vertex P2 of the image-side surface of the third lens element on the optical axis (That is, an axial distance between the projection P1 and an imaged object is less than an axial distance between the vertex P2 and the imaged object). Furthermore, the projection P1 is closer to the image side of the optical imaging system than a vertex P3 of the object-side surface of the third lens element on the optical axis (That is, an axial distance between the projection P1 and an image surface is less than an axial distance between the vertex P3 and the image surface). Therefore, it is favorable for correcting the distortion at the peripheral region of the image. Furthermore, it is favorable for preventing the third lens element from overly curved so as to solve the molding problems. As seen in FIG. 17, it shows a schematic view of P1, P2 and P3 in FIG. 1.

The fourth lens element with positive refractive power has an object-side surface being concave in a paraxial region thereof and an image-side surface being convex in a paraxial region thereof. Therefore, it is favorable for effectively correcting the Petzval sum of the optical imaging system so as to improve the flatness of the image surface and effectively correct the astigmatism.

The fifth lens element with negative refractive power can have an object-side surface being convex in a paraxial region thereof. The fifth lens element has an image-side surface being concave in a paraxial region thereof, and at least one convex shape in an off-axis region thereof. Therefore, it is favorable with the principal point of the optical imaging system being positioned away from the image side of the optical imaging system for reducing the back focal length of the optical imaging system, thereby keeping a compact size thereof. Furthermore, it is favorable for improving the image-sensing efficiency of the image sensor and further correcting the aberration of the off-axis by effectively reducing the incident angle of the light projecting onto the image sensor. Moreover, the image-side surface of the fifth lens element is favorable for further correcting the distortion at the peripheral region of the image.

When an axial distance between the first lens element and the second lens element is T12, a central thickness of the second lens element is CT2, the following condition is satisfied: 1.05<T12/CT2. Therefore, when the second lens element with positive refractive power, the third lens element with negative refractive power, the fourth lens element with positive refractive power, the fifth lens element with negative refractive power and the aforementioned condition of T12/CT2 are satisfied, it is favorable with an entrance pupil of the optical imaging system being positioned towards the image surface for enlarging the view angle and reducing the total track length of the optical imaging system. Preferably, the following condition is satisfied: 1.15<T12/CT2<3.5.

When a central thickness of the fourth lens element is CT4, a central thickness of the fifth lens element is CT5, the following condition is satisfied: 1.30<CT4/CT5. Therefore, it is favorable for reducing numerous lens molding problems and keeping the optical imaging system compact.

When a curvature radius of the object-side surface of the third lens element is R5, a curvature radius of the image-side surface of the third lens element is R6, the following condition is satisfied: (R5+R6)/(R5−R6)<−0.25. Therefore, it is favorable for improving the spherical aberration correction capability of the optical imaging system. Preferably, the following condition is satisfied: −2.0<(R5+R6)/(R5−R6)<−0.50.

When a focal length of the first lens element is f1, a focal length of the second lens element is f2, the following condition is satisfied: |f2/f1|<0.80. Therefore, it is favorable for evenly distributing the refractive power of the first lens element and the second lens element so as to effectively avoid excessive aberration. Preferably, the following condition is satisfied: |f2/f1|<0.40.

According to the optical imaging system of the present disclosure, in some embodiments, the fourth lens element has the largest central thickness among the first lens element, the second lens element, the third lens element, the fourth lens element and the fifth lens element. That is, when a central thickness of the first lens element is CT1, a central thickness of the second lens element is CT2, a central thickness of the third lens element is CT3, a central thickness of the fourth lens element is CT4, a central thickness of the fifth lens element is CT5, the central thickness of the fourth lens element CT4 is larger than the central thicknesses of CT1, CT2, CT3, or CT5. Therefore, the fourth lens element has sufficient positive refractive power so that it is favorable for reducing the back focal length of the optical imaging system so as to maintain a compact size thereof.

When the axial distance between the first lens element and the second lens element is T12, an axial distance between the second lens element and the third lens element is T23, an axial distance between the third lens element and the fourth lens element is T34, an axial distance between the fourth lens element and the fifth lens element is T45, the following condition can be satisfied: $0.90<T12/(T23+T34+T45)<2.0$. Therefore, the axial distance between the first lens element and the second lens element is properly arranged so that it is favorable for reducing the total track length of the optical imaging system so as to maintain a compact size thereof while providing the optical imaging system with a sufficient field of view.

When a focal length of the third lens element is f3, a focal length of the fourth lens element is f4, a focal length of the fifth lens element is f5, the following condition can be satisfied: $3.0<|f3/f4|+|f4/f5|+|f5/f3|<3.6$. Therefore, it is favorable for evenly distributing the refractive power of the third lens element, the fourth lens element and the fifth lens element so as to avoid overloading the refractive power on a single lens element, thereby reducing numerous lens molding problems.

When the central thickness of the first lens element is CT1, the central thickness of the third lens element is CT3, the central thickness of the fourth lens element is CT4, the following condition can be satisfied: $1.35<CT4/(CT1+CT3)<2.5$. Therefore, it is favorable for reducing numerous lens molding problems so as to increase the manufacturing yield rate. Furthermore, it is favorable for keeping the optical imaging system compact.

When a curvature radius of the object-side surface of the fourth lens element is R7, the focal length of the fifth lens element is f5, the following condition can be satisfied: $1.85<R7/f5$. Therefore, the curvature radius of the object-side surface of the fourth lens element is proper so that it is favorable for avoiding excessive aberration and enhancing the resolution of the optical imaging system.

When half of a maximal field of view of the optical imaging system is HFOV, the following condition can be satisfied: $0.85<\tan(HFOV)<1.50$. Therefore, it is favorable for providing the optical imaging system with a sufficient field of view.

When an Abbe number of the first lens element is V1, an Abbe number of the fifth lens element is V5, the following condition can be satisfied: $V1-V5<10$. Therefore, it is favorable for correcting the chromatic aberration of the optical imaging system.

When a focal length of the optical imaging system is f, the curvature radius of the object-side surface of the third lens element is R5, the curvature radius of the image-side surface of the third lens element is R6, the following condition can be satisfied: $0.85<(f/R6)-(f/R5)<2.0$. Therefore, it is favorable for correcting the spherical aberration of the optical imaging system so as to improve the image quality.

When the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, the axial distance between the first lens element and the second lens element T12 can be larger than the axial distances of T23, T34, or T45. Furthermore, the following condition can be satisfied $8.0<T12/T34<25.0$. Therefore, it is favorable for tightly arranging the lens elements so as to reducing the total track length of the optical imaging system while keeping the optical imaging system compact.

According to the optical imaging system of the present disclosure, an aperture stop can be configured as a front stop or a middle stop. A front stop disposed between an imaged object and the first lens element can provide a longer distance between an exit pupil of the optical imaging system and the image surface with a telecentric configuration and thereby improves the image-sensing efficiency of an image sensor (for example, CCD or CMOS). A middle stop disposed between the first lens element and the image surface is favorable for enlarging the view angle of the optical imaging system and thereby provides a wider field of view for the same.

According to the optical imaging system of the present disclosure, the lens elements thereof can be made of glass or plastic material. When the lens elements are made of glass material, the distribution of the refractive power of the optical imaging system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical imaging system can also be reduced.

According to the optical imaging system of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the optical imaging system of the present disclosure, an image surface of the optical imaging system, based on the corresponding image sensor, can be flat or curved, especially a curved surface being concave facing towards the object side of the optical imaging system.

According to the optical imaging system of the present disclosure, the optical imaging system can include at least one stop, such as an aperture stop, a glare stop or a field stop. Said glare stop or said field stop is set for eliminating the stray light and thereby improving the image quality thereof.

According to the present disclosure, an image capturing unit is provided. The image capturing unit includes the optical imaging system according to the aforementioned optical imaging system of the present disclosure, and an image sensor, wherein the image sensor is disposed on the image side of the aforementioned optical imaging system, that is, the image sensor can be disposed on or near an image surface of the aforementioned optical imaging system. In some embodiments, the image capturing unit can further include a barrel member, a holding member or a combination thereof.

Figure 19:
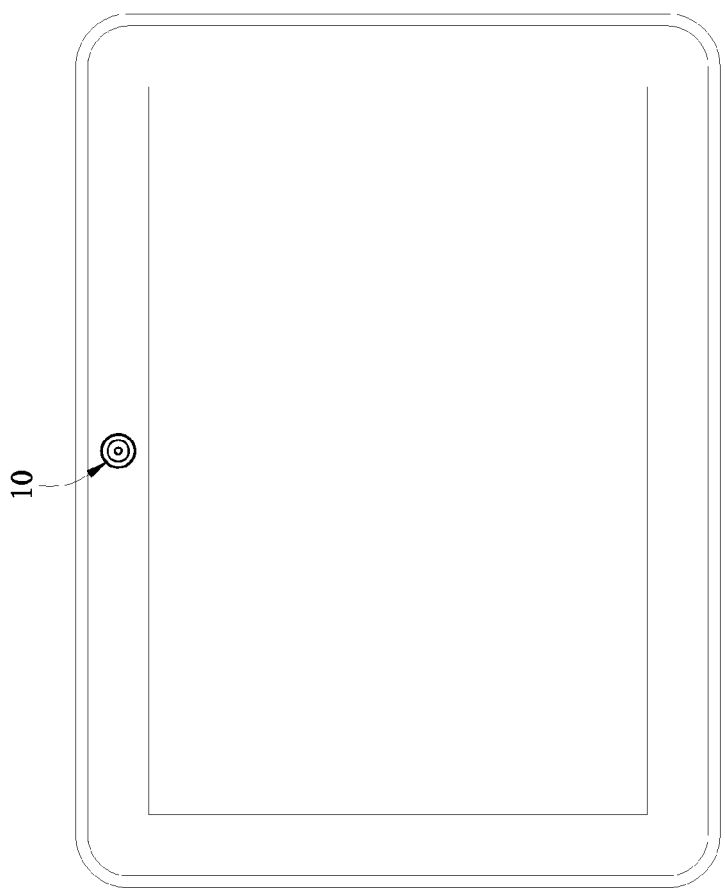
FIG. 19 shows an electronic device according to another embodiment.
Figure 18:
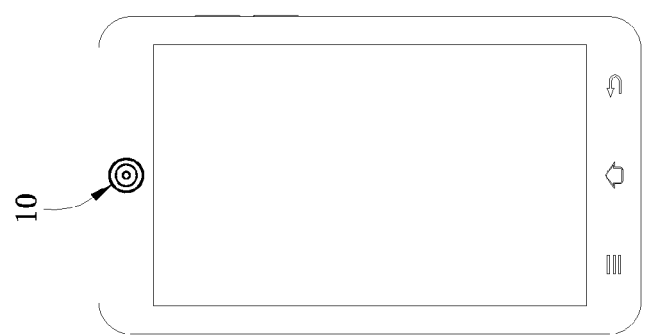
FIG. 18 shows an electronic device according to one embodiment.
Figure 20:
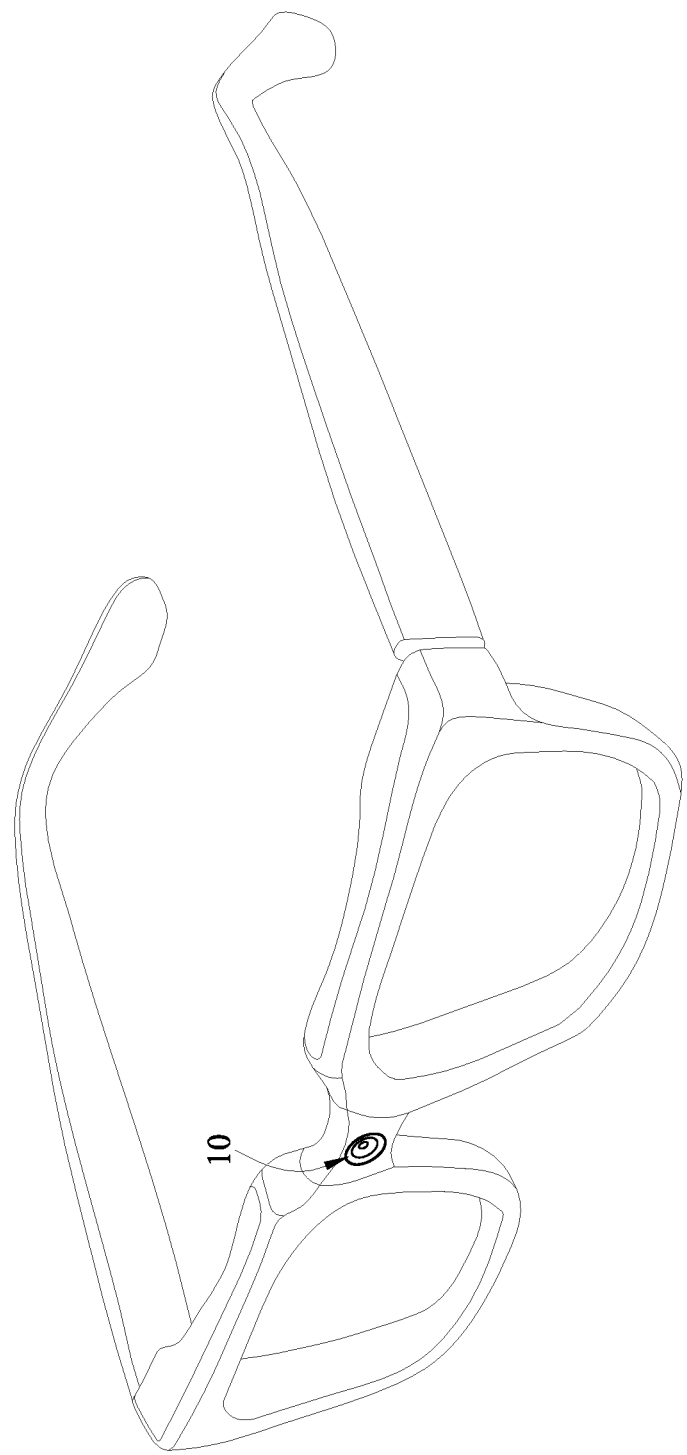
FIG. 20 shows an electronic device according to still another embodiment.

In FIG. 18, FIG. 19, and FIG. 20, an image capturing device 10 may be installed in, but not limited to, an electronic device, including a smart phone (FIG. 18), a tablet personal computer (FIG. 19) or a wearable device (FIG. 20). The three figures of different kinds of electronic device are only exemplary for showing the image capturing device of present disclosure installing in an electronic device and is not limited thereto. In some embodiments, the electronic device can further include, but not limited to, a display unit, a control unit, a storage unit, a random access memory unit (RAM), a read only memory unit (ROM) or a combination thereof.

According to the optical imaging system of the present disclosure, the optical imaging system can be optionally applied to optical systems with a movable focus. Furthermore, the optical imaging system is featured with good capability in the correction of aberration and high image quality, and can be applied to 3D (three-dimensional) image capturing applications, in products such as digital cameras, mobile devices, digital tablets, wearable devices, smart televisions, wireless monitoring devices, motion sensing input devices, driving recorders, rear view cameras and other electronic imaging devices. According to the above description of the present disclosure, the following specific embodiments are provided for further explanation.

1st Embodiment

Figure 1:
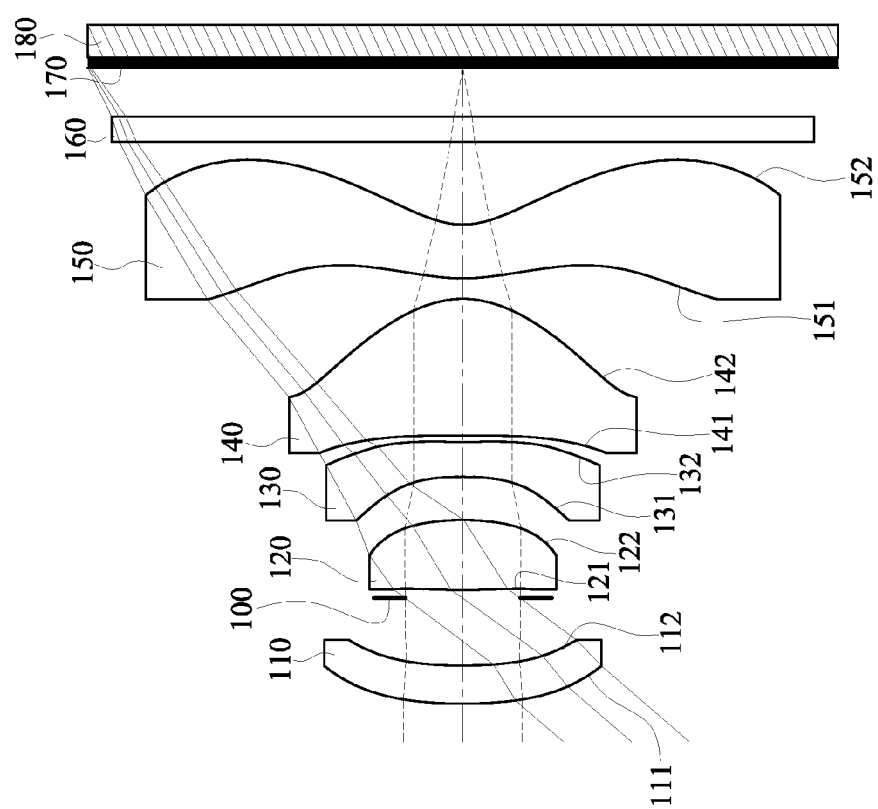
FIG. 1 is a schematic view of an image capturing unit according to the 1st embodiment of the present disclosure.
Figure 2:
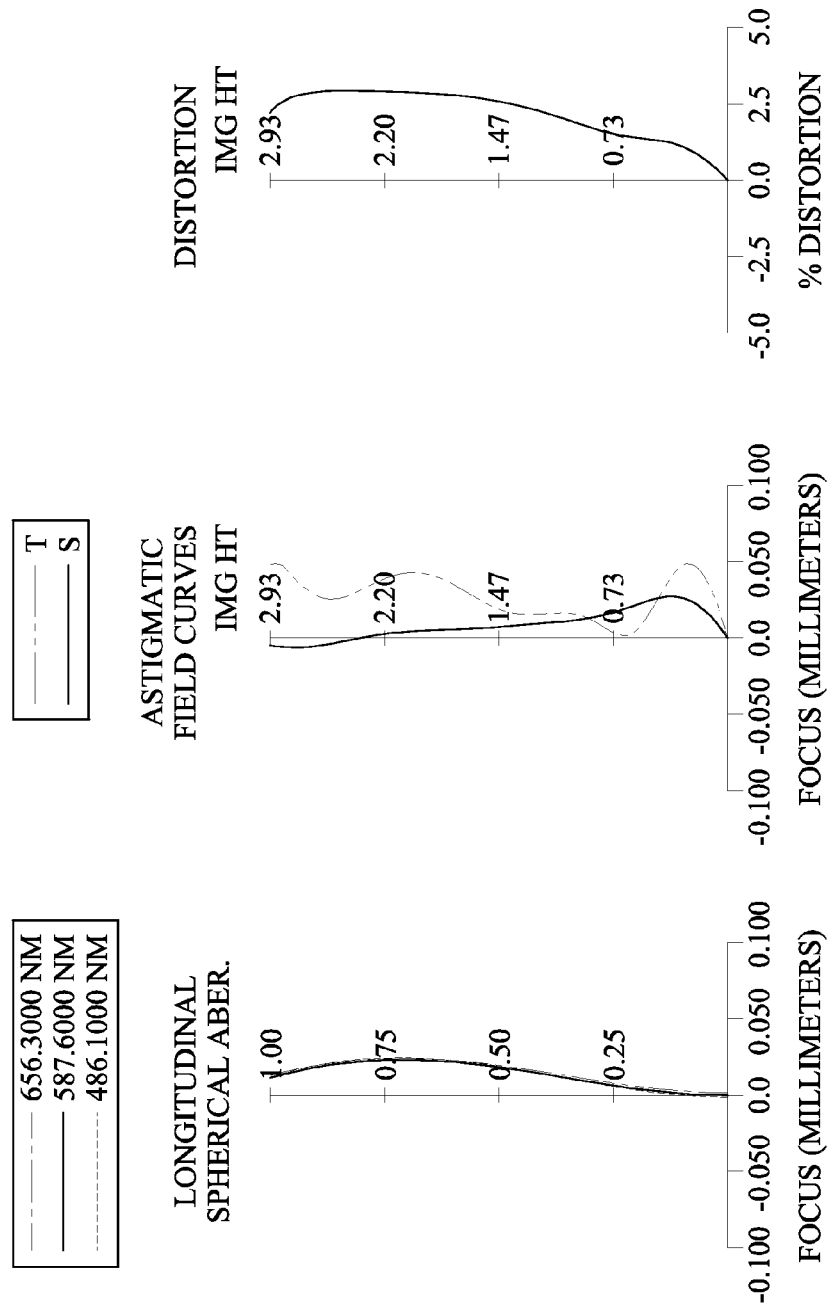
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging system (its reference numeral is omitted) of the present disclosure and an image sensor 180. The optical imaging system includes, in order from an object side to an image side, a first lens element 110, an aperture stop 100, a second lens element 120, a third lens element 130, a fourth lens element 140, a fifth lens element 150, an IR-cut filter 160 and an image surface 170, wherein the optical imaging system has a total of five lens elements (110-150) with refractive power.

The first lens element 110 with negative refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric. The object-side surface 121 of the second lens element 120 has at least one concave shape in an off-axis region thereof.

The third lens element 130 with negative refractive power has an object-side surface 131 being concave in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has at least one convex shape in an off-axis region thereof.

The IR-cut filter 160 is made of glass and located between the fifth lens element 150 and the image surface 170, and will not affect the focal length of the optical imaging system. The image sensor 180 is disposed on or near the image surface 170 of the optical imaging system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging system of the image capturing unit according to the 1st embodiment, when a focal length of the optical imaging system is f, an f-number of the optical imaging system is Fno, and half of a maximal field of view of the optical imaging system is HFOV, these parameters have the following values: f=2.47 millimeters (mm); Fno=2.65; and HFOV=49.1 degrees (deg.).

When half of the maximal field of view of the optical imaging system is HFOV, the following condition is satisfied: tan(HFOV)=1.15.

When an Abbe number of the first lens element 110 is V1, an Abbe number of the fifth lens element 150 is V5, the following condition is satisfied:

$V1-V5=-32.30$.

When an axial distance between the first lens element 110 and the second lens element 120 is T12, a central thickness of the second lens element 120 is CT2, the following condition is satisfied: T12/CT2=1.08.

When the axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, the following condition is satisfied: T12/(T23+T34+T45)=1.08.

When the axial distance between the first lens element 110 and the second lens element 120 is T12, the axial distance between the third lens element 130 and the fourth lens element 140 is T34, the following condition is satisfied: T12/T34=11.880.

When a central thickness of the first lens element 110 is CT1, a central thickness of the third lens element 130 is CT3, a central thickness of the fourth lens element 140 is CT4, the following condition is satisfied: CT4/(CT1+CT3)=1.87.

When the central thickness of the fourth lens element 140 is CT4, a central thickness of the fifth lens element 150 is CT5, the following condition is satisfied: CT4/CT5=2.55.

When a focal length of the first lens element 110 is f1, a focal length of the second lens element 120 is f2, the following condition is satisfied: |f2/f1|=0.004.

When a focal length of the third lens element 130 is f3, a focal length of the fourth lens element 140 is f4, a focal length of the fifth lens element 150 is f5, the following condition is satisfied: |f3/f4|+|f4/f5|+|f5/f3|=3.38.

When a curvature radius of the object-side surface 131 of the third lens element 130 is R5, a curvature radius of the image-side surface 132 of the third lens element 130 is R6, the following condition is satisfied: (R5+R6)/(R5−R6)=−0.62.

When the focal length of the optical imaging system is f, the curvature radius of the object-side surface 131 of the third lens element 130 is R5, the curvature radius of the image-side surface 132 of the third lens element 130 is R6, the following condition is satisfied: (f/R6)−(f/R5)=1.34.

When a curvature radius of the object-side surface 141 of the fourth lens element 140 is R7, the focal length of the fifth lens element 150 is f5, the following condition is satisfied: R7/f5=9.10.

The detailed optical data of the 1st embodiment are shown in Table 1 and the aspheric surface data are shown in Table 2 below.

TABLE 1

1st Embodiment
f = 2.47 mm, Fno = 2.65, HFOV = 49.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.966 | (ASP) | 0.300 | Plastic | 1.639 | 23.5 | −710.22 |
| 2 | | 3.815 | (ASP) | 0.529 | | | | |
| 3 | Ape. Stop | Plano | | 0.065 | | | | |
| 4 | Lens 2 | 5.330 | (ASP) | 0.550 | Plastic | 1.544 | 55.9 | 2.88 |
| 5 | | −2.139 | (ASP) | 0.341 | | | | |
| 6 | Lens 3 | −2.276 | (ASP) | 0.274 | Plastic | 1.650 | 21.5 | −2.81 |
| 7 | | 9.791 | (ASP) | 0.050 | | | | |
| 8 | Lens 4 | −19.650 | (ASP) | 1.075 | Plastic | 1.544 | 55.9 | 1.45 |
| 9 | | −0.771 | (ASP) | 0.161 | | | | |
| 10 | Lens 5 | 1.468 | (ASP) | 0.422 | Plastic | 1.530 | 55.8 | −2.16 |
| 11 | | 0.579 | (ASP) | 0.650 | | | | |
| 12 | IR-cut filter | Plano | | 0.200 | Glass | 1.517 | 64.2 | — |
| 13 | | Plano | | 0.383 | | | | |
| 14 | Image | Plano | | — | | | | |

Note:
Reference wavelength (d-line) is 587.6 nm.

TABLE 2

Aspheric Coefficients

| Surface # | 1 | 2 | 4 | 5 | 6 |
|---|---|---|---|---|---|
| k = | 3.8914E+00 | −9.0000E+01 | −9.0000E+01 | 4.9926E+00 | −3.6821E+00 |
| A4 = | 1.0644E−01 | 3.6654E−01 | −6.6463E−02 | −2.8200E−01 | −6.4980E−01 |
| A6 = | −3.2463E−02 | −4.9640E−01 | −4.4187E−02 | 3.7181E−01 | 1.9431E−01 |
| A8 = | 1.2713E−02 | 7.7200E−01 | −1.8314E+00 | −2.3650E+00 | 6.8529E−02 |
| A10 = | 2.2405E−02 | −5.6495E−01 | 3.3850E+00 | 4.8400E+00 | 2.3004E−01 |
| A12 = | −6.7421E−03 | 1.1875E−01 | −6.1035E+00 | −4.6226E+00 | −3.7581E−02 |
| A14 = | −7.6764E−03 | −1.1341E−02 | — | — | — |

| Surface # | 7 | 8 | 9 | 10 | 11 |
|---|---|---|---|---|---|
| k = | −9.0000E+01 | 7.5934E+01 | −2.1087E+00 | −2.1881E+01 | −3.6683E+00 |
| A4 = | −3.6479E−01 | 9.6002E−03 | −8.2755E−02 | −3.5287E−02 | −8.2366E−02 |
| A6 = | 6.3285E−02 | −4.2921E−01 | 5.1528E−02 | −4.9412E−02 | 2.8479E−02 |
| A8 = | 3.3786E−02 | 9.2384E−01 | −3.3782E−02 | 3.7224E−02 | −7.4900E−03 |
| A10 = | −3.2426E−01 | −1.0506E+00 | 3.0382E−03 | −1.2330E−02 | 1.2350E−03 |
| A12 = | 9.3106E−02 | 7.2273E−01 | 1.7468E−02 | 2.3134E−03 | −1.2526E−04 |
| A14 = | — | −2.9664E−01 | −5.5967E−03 | −2.3297E−04 | 7.5613E−06 |
| A16 = | — | 5.5527E−02 | — | 9.5769E−06 | −2.3096E−07 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
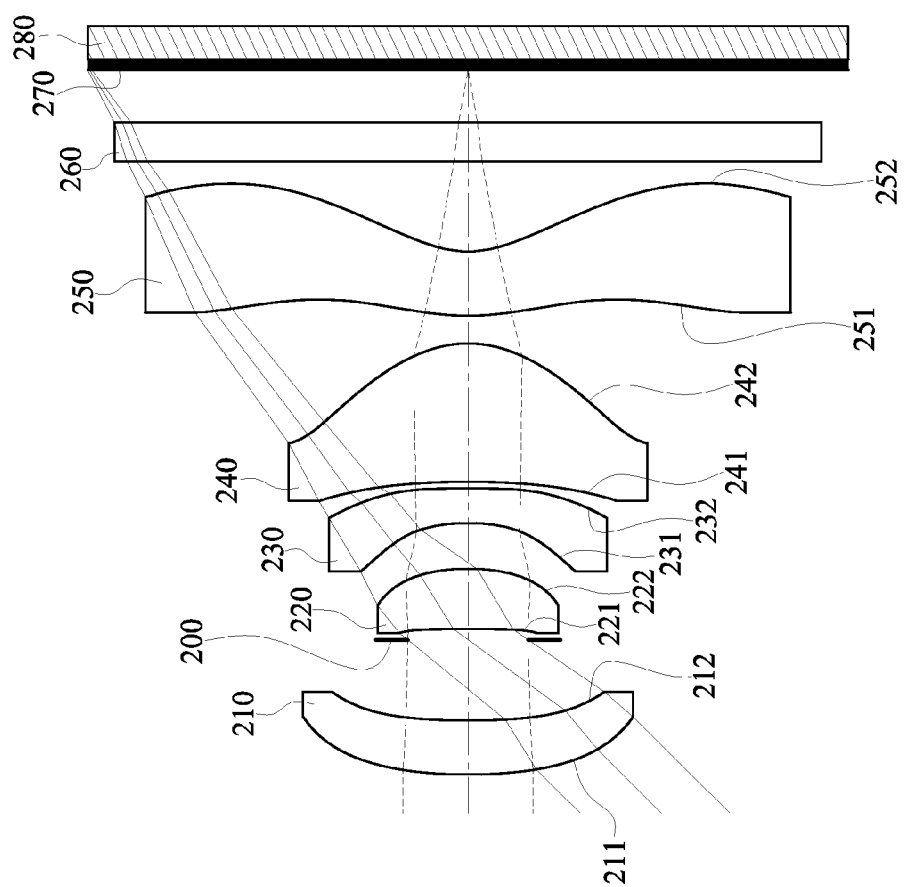
FIG. 3 is a schematic view of an image capturing unit according to the 2nd embodiment of the present disclosure.
Figure 4:
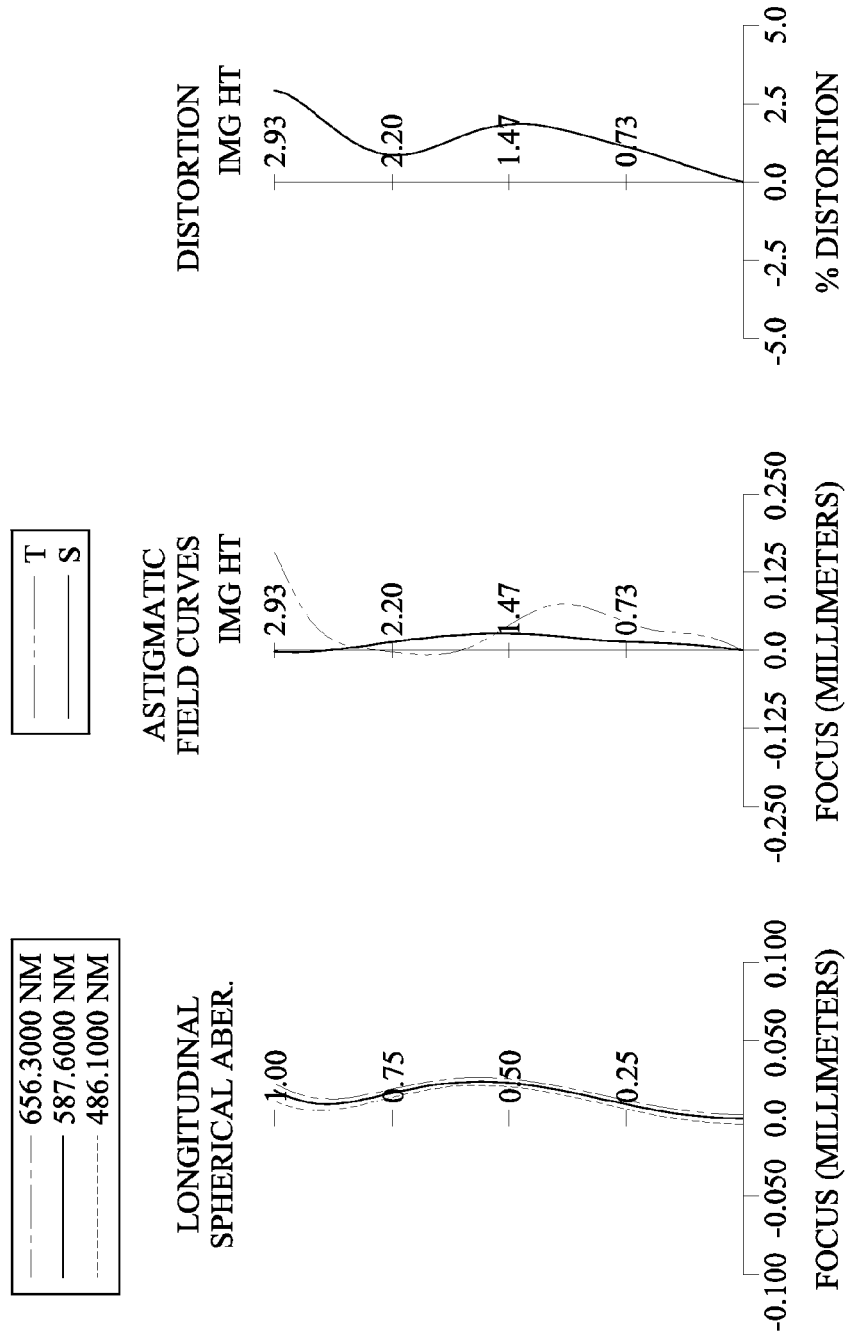
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging system (its reference numeral is omitted) of the present disclosure and an image sensor 280. The optical imaging system includes, in order from an object side to an image side, a first lens element 210, an aperture stop 200, a second lens element 220, a third lens element 230, a fourth lens element 240, a fifth lens element 250, an IR-cut filter 260 and an image surface 270, wherein the optical imaging system has a total of five lens elements (210-250) with refractive power.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric.

The third lens element 230 with negative refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The image-side surface 252 of the fifth lens element 250 has at least one convex shape in an off-axis region thereof.

The IR-cut filter 260 is made of glass and located between the fifth lens element 250 and the image surface 270, and will not affect the focal length of the optical imaging system. The image sensor 280 is disposed on or near the image surface 270 of the optical imaging system.

The detailed optical data of the 2nd embodiment are shown in Table 3 and the aspheric surface data are shown in Table 4 below.

TABLE 3

2nd Embodiment
f = 2.82 mm, Fno = 2.80, HFOV = 45.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.857 | (ASP) | 0.420 | Plastic | 1.535 | 55.7 | 17.30 |
| 2 | | 6.363 | (ASP) | 0.626 | | | | |
| 3 | Ape. Stop | Plano | | 0.084 | | | | |
| 4 | Lens 2 | −82.095 | (ASP) | 0.467 | Plastic | 1.544 | 55.9 | 3.18 |
| 5 | | −1.699 | (ASP) | 0.355 | | | | |
| 6 | Lens 3 | −1.648 | (ASP) | 0.269 | Plastic | 1.639 | 23.5 | −2.81 |
| 7 | | −21.165 | (ASP) | 0.050 | | | | |
| 8 | Lens 4 | −6.605 | (ASP) | 1.075 | Plastic | 1.535 | 55.7 | 1.75 |
| 9 | | −0.867 | (ASP) | 0.213 | | | | |
| 10 | Lens 5 | 1.871 | (ASP) | 0.500 | Plastic | 1.530 | 55.8 | −2.94 |
| 11 | | 0.772 | (ASP) | 0.700 | | | | |
| 12 | IR-cut filter | Plano | | 0.300 | Glass | 1.517 | 64.2 | — |
| 13 | | Plano | | 0.406 | | | | |
| 14 | Image | Plano | | — | | | | |

Note:
Reference wavelength (d-line) is 587.6 nm.

TABLE 4

Aspheric Coefficients

| Surface # | 1 | 2 | 4 | 5 | 6 |
|---|---|---|---|---|---|
| k = | −3.5326E+00 | −9.0000E+01 | −9.0000E+01 | 3.7832E+00 | −1.6899E+00 |
| A4 = | 7.2831E−02 | 2.1270E−01 | −1.9542E−01 | −2.7976E−01 | −6.4526E−01 |
| A6 = | −2.1650E−02 | −4.4583E−01 | −1.7465E−01 | 3.2104E−01 | 2.3890E−01 |

TABLE 4-continued

| Aspheric Coefficients | | | | | |
|---|---|---|---|---|---|
| A8 = | −9.3211E−03 | 8.5458E−01 | −1.1833E+00 | −1.9896E+00 | 9.1167E−02 |
| A10 = | 5.2944E−02 | −7.8691E−01 | 8.9591E−01 | 4.4961E+00 | 2.4908E−01 |
| A12 = | −3.2865E−02 | 3.6466E−01 | −7.1247E+00 | −4.8137E+00 | −2.9487E−02 |
| A14 = | 7.1986E−03 | −6.9581E−02 | — | — | — |

| Surface # | 7 | 8 | 9 | 10 | 11 |
|---|---|---|---|---|---|
| k = | 7.0055E+01 | 2.9276E+01 | −1.9108E+00 | −1.7673E+01 | −3.4643E+00 |
| A4 = | −2.9114E−01 | 8.3313E−02 | −7.5339E−02 | −1.2019E−02 | −6.6440E−02 |
| A6 = | 2.9781E−02 | −4.6454E−01 | 4.8902E−02 | −5.0298E−02 | 2.1197E−02 |
| A8 = | 3.2705E−01 | 9.3347E−01 | −3.4302E−02 | 3.6637E−02 | −5.9305E−03 |
| A10 = | −3.2541E−01 | −1.0426E+00 | 3.0356E−03 | −1.2367E−02 | 1.1258E−03 |
| A12 = | 9.6329E−02 | 7.2649E−01 | 1.7424E−02 | 2.3184E−03 | −1.2741E−04 |
| A14 = | — | −2.9637E−01 | −5.6647E−03 | −2.3035E−04 | 7.8029E−06 |
| A16 = | — | 5.4594E−02 | — | 9.4367E−06 | −2.0127E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.82 | CT4/(CT1 + CT3) | 1.56 |
| Fno | 2.80 | CT4/CT5 | 2.15 |
| HFOV [deg.] | 45.2 | \|f2/f1\| | 0.18 |
| tan(HFOV) | 1.01 | \|f3/f4\| + \|f4/f5\| + \|f5/f3\| | 3.25 |
| V1 − V5 | −0.10 | (R5 + R6)/(R5 − R6) | −1.17 |
| T12/CT2 | 1.52 | (f/R6) − (f/R5) | 1.58 |
| T12/(T23 + T34 + T45) | 1.15 | R7/f5 | 2.25 |
| T12/T34 | 14.200 | | |

3rd Embodiment

Figure 5:
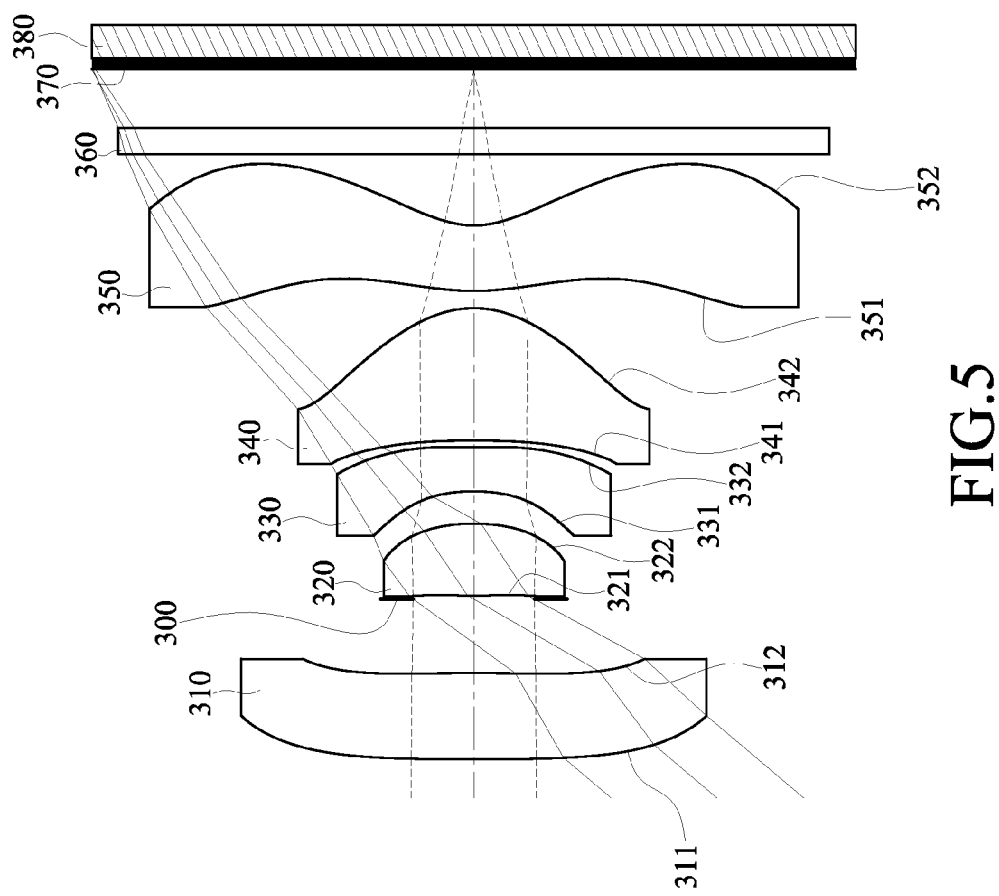
FIG. 5 is a schematic view of an image capturing unit according to the 3rd embodiment of the present disclosure.
Figure 6:
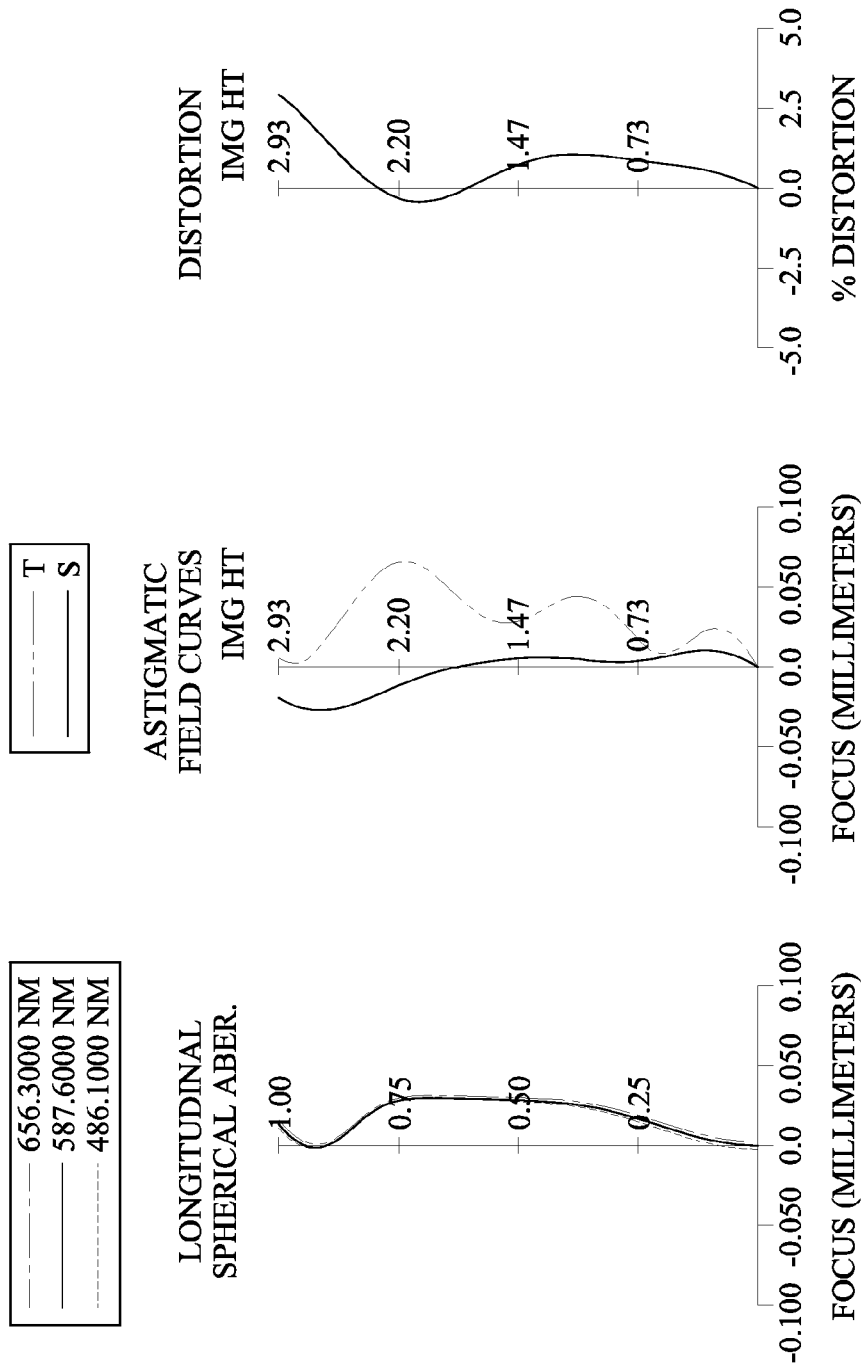
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging system (its reference numeral is omitted) of the present disclosure and an image sensor 380. The optical imaging system includes, in order from an object side to an image side, a first lens element 310, an aperture stop 300, a second lens element 320, a third lens element 330, a fourth lens element 340, a fifth lens element 350, an IR-cut filter 360 and an image surface 370, wherein the optical imaging system has a total of five lens elements (310-350) with refractive power.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric.

The second lens element 320 with positive refractive power has an object-side surface 321 being convex in a paraxial region thereof and an image-side surface 322 being convex in a paraxial region thereof. The second lens element 320 is made of glass material and has the object-side surface 321 and the image-side surface 322 being both aspheric. The object-side surface 321 of the second lens element 320 has at least one concave shape in an off-axis region thereof.

The third lens element 330 with negative refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least one convex shape in an off-axis region thereof.

The IR-cut filter 360 is made of glass and located between the fifth lens element 350 and the image surface 370, and will not affect the focal length of the optical imaging system. The image sensor 380 is disposed on or near the image surface 370 of the optical imaging system.

The detailed optical data of the 3rd embodiment are shown in Table 5 and the aspheric surface data are shown in Table 6 below.

TABLE 5

3rd Embodiment
f = 2.40 mm, Fno = 2.50, HFOV = 49.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 100.000 (ASP) | 0.661 | Plastic | 1.608 | 25.7 | 19.51 |

TABLE 5-continued

3rd Embodiment
f = 2.40 mm, Fno = 2.50, HFOV = 49.8 deg.

| Surface # | | Curvature Radius | | Thickness | Material | Index | Abbe # | Focal Length |
|---|---|---|---|---|---|---|---|---|
| 2 | | −13.427 | (ASP) | 0.568 | | | | |
| 3 | Ape. Stop | Plano | | 0.028 | | | | |
| 4 | Lens 2 | 15.870 | (ASP) | 0.552 | Glass | 1.542 | 62.9 | 2.52 |
| 5 | | −1.478 | (ASP) | 0.247 | | | | |
| 6 | Lens 3 | −1.496 | (ASP) | 0.342 | Plastic | 1.633 | 23.4 | −2.51 |
| 7 | | −27.307 | (ASP) | 0.050 | | | | |
| 8 | Lens 4 | −5.960 | (ASP) | 1.017 | Plastic | 1.535 | 55.7 | 1.55 |
| 9 | | −0.770 | (ASP) | 0.131 | | | | |
| 10 | Lens 5 | 1.838 | (ASP) | 0.503 | Plastic | 1.535 | 55.7 | −2.34 |
| 11 | | 0.674 | (ASP) | 0.550 | | | | |
| 12 | IR-cut filter | Plano | | 0.200 | Glass | 1.517 | 64.2 | — |
| 13 | | Plano | | 0.451 | | | | |
| 14 | Image | Plano | | — | | | | |

Note:
Reference wavelength (d-line) is 587.6 nm.

TABLE 6

Aspheric Coefficients

| Surface # | 1 | 2 | 4 | 5 | 6 |
|---|---|---|---|---|---|
| k = | −6.6430E+01 | −9.0000E+01 | 4.4528E+00 | 3.1822E+00 | −8.9020E−01 |
| A4 = | 3.2680E−02 | 6.7059E−02 | −2.1017E−01 | −1.5238E−01 | −5.8746E−01 |
| A6 = | −9.9201E−03 | −3.5178E−02 | 1.7761E+00 | −5.3686E−01 | −4.2931E−01 |
| A8 = | 7.6963E−03 | 4.3924E−02 | −2.2145E+01 | 2.2128E+00 | 2.2373E+00 |
| A10 = | −3.4114E−03 | −4.0751E−02 | 1.0047E+02 | −3.7092E+00 | −1.6856E+00 |
| A12 = | 8.2781E−04 | 2.1860E−02 | −1.7428E+02 | 2.8901E+00 | 4.9325E−02 |
| A14 = | −7.0404E−05 | −4.3369E−03 | — | — | — |

| Surface # | 7 | 8 | 9 | 10 | 11 |
|---|---|---|---|---|---|
| k = | 5.9808E+01 | 2.6236E+01 | −1.8376E+00 | −2.4652E+01 | −3.7034E+00 |
| A4 = | −2.1952E−01 | 6.6256E−02 | −7.3210E−02 | −2.6662E−02 | −8.0456E−02 |
| A6 = | −3.1841E−01 | −5.0462E−01 | 3.9319E−02 | −4.5712E−02 | 2.8672E−02 |
| A8 = | 1.0182E+00 | 1.1342E+00 | 9.4781E−03 | 3.5161E−02 | −8.1950E−03 |
| A10 = | −9.1777E−01 | −1.3930E+00 | −4.5693E−02 | −1.2052E−02 | 1.2779E−03 |
| A12 = | 2.7561E−01 | 1.0968E+00 | 4.3520E−02 | 2.2860E−03 | −7.2900E−05 |
| A14 = | — | −5.4549E−01 | −1.1000E−02 | −2.2714E−04 | −4.0978E−06 |
| A16 = | — | 1.2765E−01 | — | 9.1382E−06 | 4.9722E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.40 | CT4/(CT1 + CT3) | 1.01 |
| Fno | 2.50 | CT4/CT5 | 2.02 |
| HFOV [deg.] | 49.8 | |f2/f1| | 0.13 |
| tan(HFOV) | 1.18 | |f3/f4| + |f4/f5| + |f5/f3| | 3.21 |
| V1 − V5 | −30.00 | (R5 + R6)/(R5 − R6) | −1.12 |
| T12/CT2 | 1.08 | (f/R6) − (f/R5) | 1.52 |
| T12/(T23 + T34 + T45) | 1.39 | R7/f5 | 2.55 |
| T12/T34 | 11.920 | | |

4th Embodiment

Figure 7:
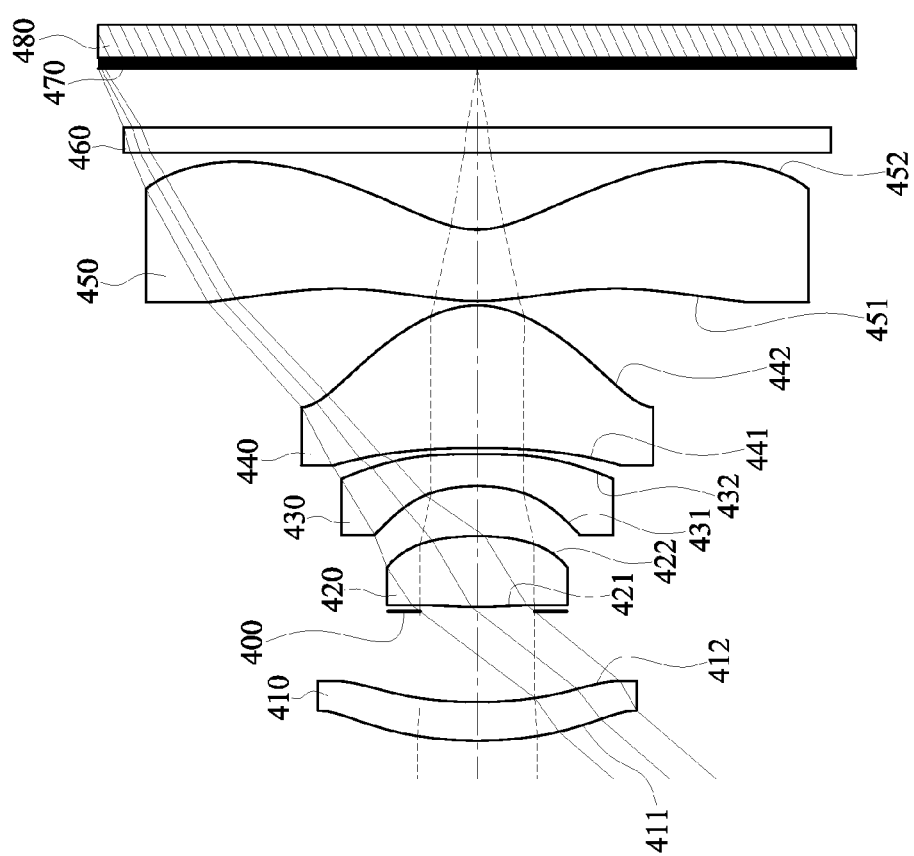
FIG. 7 is a schematic view of an image capturing unit according to the 4th embodiment of the present disclosure.
Figure 8:
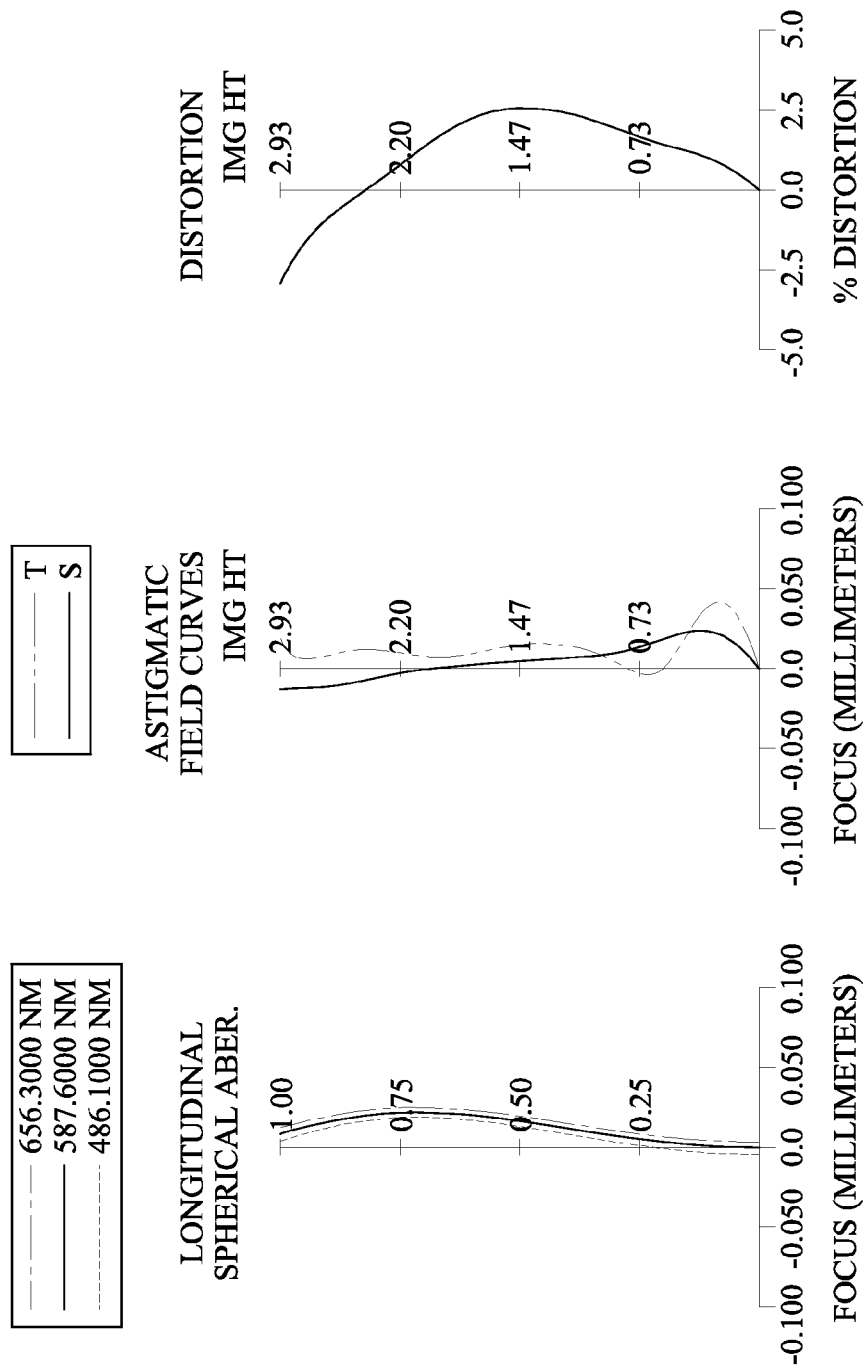
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging system (its reference numeral is omitted) of the present disclosure and an image sensor 480. The optical imaging system includes, in order from an object side to an image side, a first lens element 410, an aperture stop 400, a second lens element 420, a third lens element 430, a fourth lens element 440, a fifth lens element 450, an IR-cut filter 460 and an image surface 470, wherein the optical imaging system has a total of five lens elements (410-450) with refractive power.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being convex in a paraxial region thereof. The second lens element 420 is made of plastic material and has the object-side surface 421 and the image-side surface 422 being both aspheric. The object-side surface 421 of the second lens element 420 has at least one concave shape in an off-axis region thereof.

The third lens element 430 with negative refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The image-side surface 452 of the fifth lens element 450 has at least one convex shape in an off-axis region thereof.

The IR-cut filter 460 is made of glass and located between the fifth lens element 450 and the image surface 470, and will not affect the focal length of the optical imaging system. The image sensor 480 is disposed on or near the image surface 470 of the optical imaging system.

The detailed optical data of the 4th embodiment are shown in Table 7 and the aspheric surface data are shown in Table 8 below.

TABLE 7

4th Embodiment
f = 2.61 mm, Fno = 2.80, HFOV = 49.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.301 | (ASP) | 0.300 | Plastic | 1.544 | 55.9 | 87.24 |
| 2 | | 3.434 | (ASP) | 0.708 | | | | |
| 3 | Ape. Stop | Plano | | 0.036 | | | | |
| 4 | Lens 2 | 4.251 | (ASP) | 0.552 | Plastic | 1.544 | 55.9 | 2.63 |
| 5 | | −2.058 | (ASP) | 0.390 | | | | |
| 6 | Lens 3 | −1.442 | (ASP) | 0.250 | Plastic | 1.639 | 23.5 | −2.61 |
| 7 | | −11.298 | (ASP) | 0.046 | | | | |
| 8 | Lens 4 | −6.543 | (ASP) | 1.114 | Plastic | 1.544 | 55.9 | 1.44 |
| 9 | | −0.742 | (ASP) | 0.035 | | | | |
| 10 | Lens 5 | 1.925 | (ASP) | 0.555 | Plastic | 1.544 | 55.9 | −2.06 |
| 11 | | 0.637 | (ASP) | 0.600 | | | | |
| 12 | IR-cut filter | Plano | | 0.200 | Glass | 1.517 | 64.2 | — |
| 13 | | Plano | | 0.459 | | | | |
| 14 | Image | Plano | | — | | | | |

Note:
Reference wavelength (d-line) is 587.6 nm.

TABLE 8

Aspheric Coefficients

| Surface # | 1 | 2 | 4 | 5 | 6 |
|---|---|---|---|---|---|
| k = | −4.9085E+00 | −8.4208E+01 | −9.0000E+01 | 2.8391E+00 | −2.4884E+00 |
| A4 = | 7.5263E−02 | 3.1033E−01 | −2.3441E−02 | −2.8323E−01 | −6.4052E−01 |
| A6 = | −3.3172E−02 | −5.7483E−01 | −3.3015E−01 | 1.6384E−01 | 2.1203E−01 |
| A8 = | −2.0060E−02 | 8.3829E−01 | −1.0680E+00 | −1.9718E+00 | 4.0849E−02 |
| A10 = | 5.3138E−02 | −8.0969E−01 | 2.4525E+00 | 4.3545E+00 | 2.0864E−01 |
| A12 = | −4.6705E−02 | 3.8528E−01 | −7.1247E+00 | −4.8141E+00 | −2.3520E−02 |
| A14 = | 1.1954E−02 | −6.9581E−02 | — | — | — |

| Surface # | 7 | 8 | 9 | 10 | 11 |
|---|---|---|---|---|---|
| k = | −6.8860E+01 | 2.3235E+01 | −2.1563E+00 | −3.3966E+01 | −4.2058E+00 |
| A4 = | −2.6123E−01 | 8.3204E−02 | −9.3375E−02 | −7.4122E−03 | −5.9667E−02 |
| A6 = | 3.7680E−02 | −4.5820E−01 | 5.0599E−02 | −4.9730E−02 | 2.1085E−02 |
| A8 = | 3.2942E−01 | 9.2314E−01 | −3.2595E−02 | 3.6601E−02 | −6.0918E−03 |
| A10 = | −3.2749E−01 | −1.0429E+00 | 3.6349E−03 | −1.2392E−02 | 1.1382E−03 |
| A12 = | 9.2836E−02 | 7.2681E−01 | 1.7583E−02 | 2.3143E−03 | −1.2791E−04 |
| A14 = | — | −2.9618E−01 | −5.6433E−03 | −2.3055E−04 | 7.7661E−06 |
| A16 = | — | 5.4493E−02 | — | 9.5769E−06 | −2.0584E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.61 | CT4/(CT1 + CT3) | 2.03 |
| Fno | 2.80 | CT4/CT5 | 2.01 |
| HFOV [deg.] | 49.1 | \|f2/f1\| | 0.03 |
| tan(HFOV) | 1.15 | \|f3/f4\| + \|f4/f5\| + \|f5/f3\| | 3.30 |
| V1 − V5 | 0.00 | (R5 + R6)/(R5 − R6) | −1.29 |
| T12/CT2 | 1.35 | (f/R6) − (f/R5) | 1.58 |
| T12/(T23 + T34 + T45) | 1.58 | R7/f5 | 3.18 |
| T12/T34 | 16.174 | | |

5th Embodiment

Figure 9:
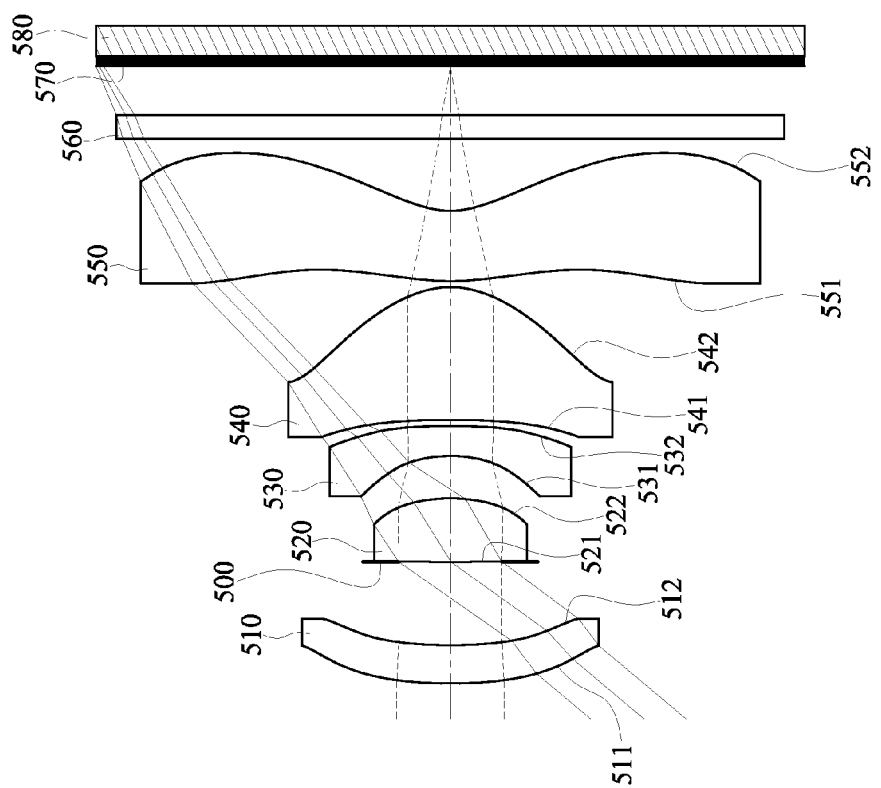
FIG. 9 is a schematic view of an image capturing unit according to the 5th embodiment of the present disclosure.
Figure 10:
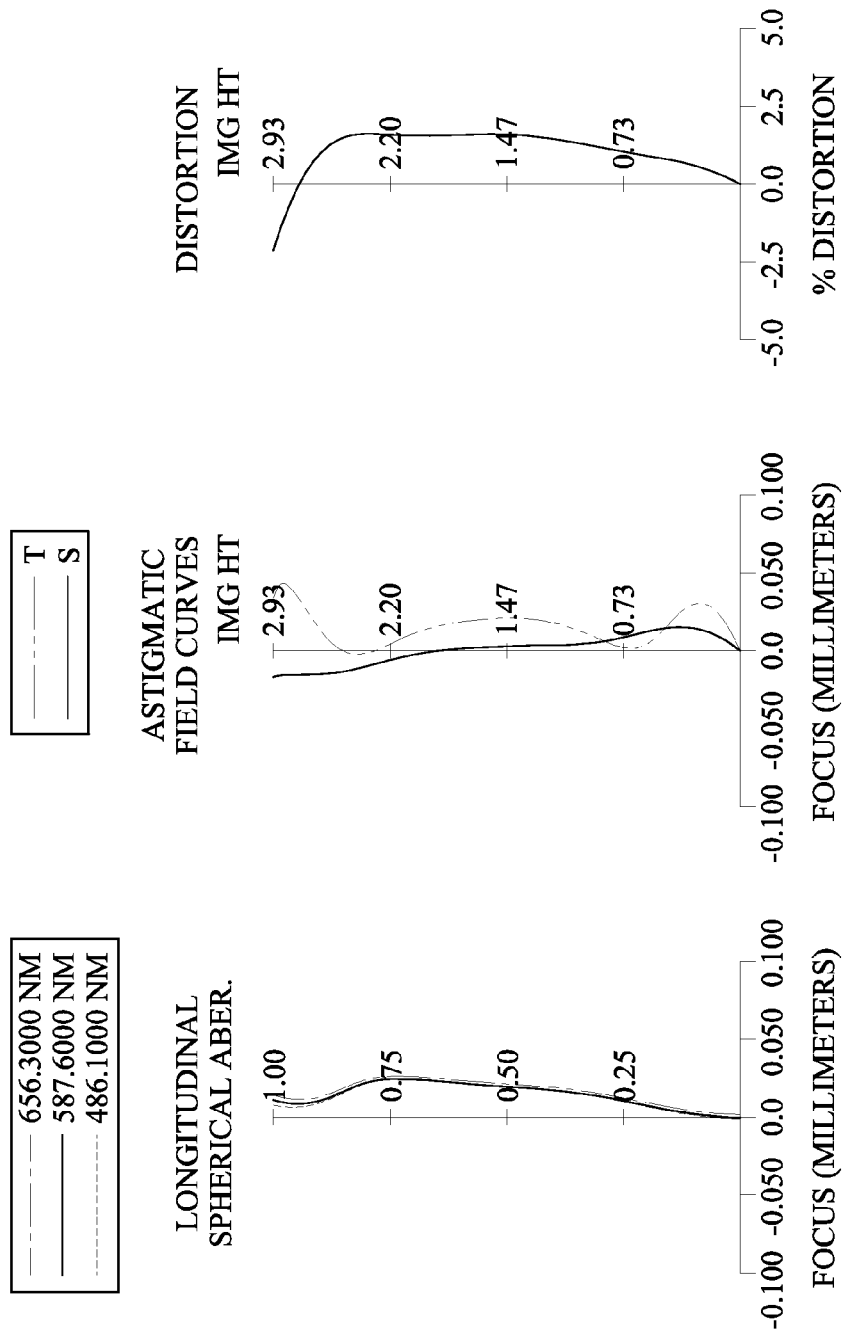
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging system (its reference numeral is omitted) of the present disclosure and an image sensor 580. The optical imaging system includes, in order from an object side to an image side, a first lens element 510, an aperture stop 500, a second lens element 520, a third lens element 530, a fourth lens element 540, a fifth lens element 550, an IR-cut filter 560 and an image surface 570, wherein the optical imaging system has a total of five lens elements (510-550) with refractive power.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric. The object-side surface 521 of the second lens element 520 has at least one concave shape in an off-axis region thereof.

The third lens element 530 with negative refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has at least one convex shape in an off-axis region thereof.

The IR-cut filter 560 is made of glass and located between the fifth lens element 550 and the image surface 570, and will not affect the focal length of the optical imaging system. The image sensor 580 is disposed on or near the image surface 570 of the optical imaging system.

The detailed optical data of the 5th embodiment are shown in Table 9 and the aspheric surface data are shown in Table 10 below.

TABLE 9

5th Embodiment
f = 2.50 mm, Fno = 2.80, HFOV = 50.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.176 | (ASP) | 0.320 | Plastic | 1.544 | 55.9 | 83.64 |
| 2 | | 4.474 | (ASP) | 0.697 | | | | |
| 3 | Ape. Stop | Plano | | −0.003 | | | | |
| 4 | Lens 2 | 6.253 | (ASP) | 0.533 | Plastic | 1.544 | 55.9 | 2.32 |
| 5 | | −1.535 | (ASP) | 0.355 | | | | |
| 6 | Lens 3 | −1.235 | (ASP) | 0.250 | Plastic | 1.639 | 23.5 | −2.28 |
| 7 | | −8.806 | (ASP) | 0.052 | | | | |
| 8 | Lens 4 | −6.465 | (ASP) | 1.109 | Plastic | 1.544 | 55.9 | 1.48 |
| 9 | | −0.761 | (ASP) | 0.050 | | | | |
| 10 | Lens 5 | 2.036 | (ASP) | 0.588 | Plastic | 1.544 | 55.9 | −2.23 |
| 11 | | 0.683 | (ASP) | 0.600 | | | | |
| 12 | IR-cut filter | Plano | | 0.200 | Glass | 1.517 | 64.2 | — |
| 13 | | Plano | | 0.408 | | | | |
| 14 | Image | Plano | | — | | | | |

Note:
Reference wavelength (d-line) is 587.6 nm.

TABLE 10

Aspheric Coefficients

| Surface # | 1 | 2 | 4 | 5 | 6 |
|---|---|---|---|---|---|
| k = | 5.4434E+00 | −8.4110E+01 | −8.9916E+01 | 2.6266E+00 | −2.3033E+00 |
| A4 = | 6.5914E−02 | 2.2060E−01 | −2.0039E−01 | −2.1223E−01 | −6.1253E−01 |
| A6 = | 1.8595E−03 | −1.1992E−01 | 1.2025E+00 | −3.4746E−01 | −3.0202E−01 |
| A8 = | −2.8179E−02 | −2.3857E−02 | −1.8768E+01 | 7.4058E−01 | 1.8917E+00 |
| A10 = | 4.1303E−02 | 3.0812E−01 | 9.4315E+01 | −1.0545E+00 | −1.4221E+00 |
| A12 = | −2.0429E−02 | −3.7592E−01 | −1.8520E+02 | −8.4871E−01 | 1.3069E−01 |
| A14 = | 2.0163E−04 | 1.2341E−01 | — | — | — |

| Surface # | 7 | 8 | 9 | 10 | 11 |
|---|---|---|---|---|---|
| k = | −6.8953E+01 | 2.4232E+01 | −2.0676E+00 | −3.0595E+01 | −4.1511E+00 |
| A4 = | −1.9511E−01 | 9.6896E−02 | −9.6949E−02 | −1.3412E−02 | −7.4148E−02 |
| A6 = | −2.5533E−01 | −5.2736E−01 | 4.6630E−02 | −4.1871E−02 | 3.1737E−02 |
| A8 = | 9.1083E−01 | 9.3599E−01 | −4.0235E−03 | 3.0795E−02 | −1.1249E−02 |
| A10 = | −8.3636E−01 | −9.0369E−01 | −3.7489E−02 | −1.0270E−02 | 2.6005E−03 |
| A12 = | 2.5291E−01 | 5.5958E−01 | 4.2391E−02 | 1.8866E−03 | −3.5321E−04 |
| A14 = | — | −2.3637E−01 | −1.0996E−02 | −1.8238E−04 | 2.4751E−05 |
| A16 = | — | 5.2410E−02 | — | 7.2234E−06 | −6.7050E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.50 | CT4/(CT1 + CT3) | 1.95 |
| Fno | 2.80 | CT4/CT5 | 1.89 |
| HFOV [deg.] | 50.1 | \|f2/f1\| | 0.03 |
| tan(HFOV) | 1.20 | \|f3/f4\| + \|f4/f5\| + \|f5/f3\| | 3.18 |
| V1 − V5 | 0.00 | (R5 + R6)/(R5 − R6) | −1.33 |
| T12/CT2 | 1.30 | (f/R6) − (f/R5) | 1.74 |
| T12/(T23 + T34 + T45) | 1.52 | R7/f5 | 2.90 |
| T12/T34 | 13.346 | | |

6th Embodiment

Figure 11:
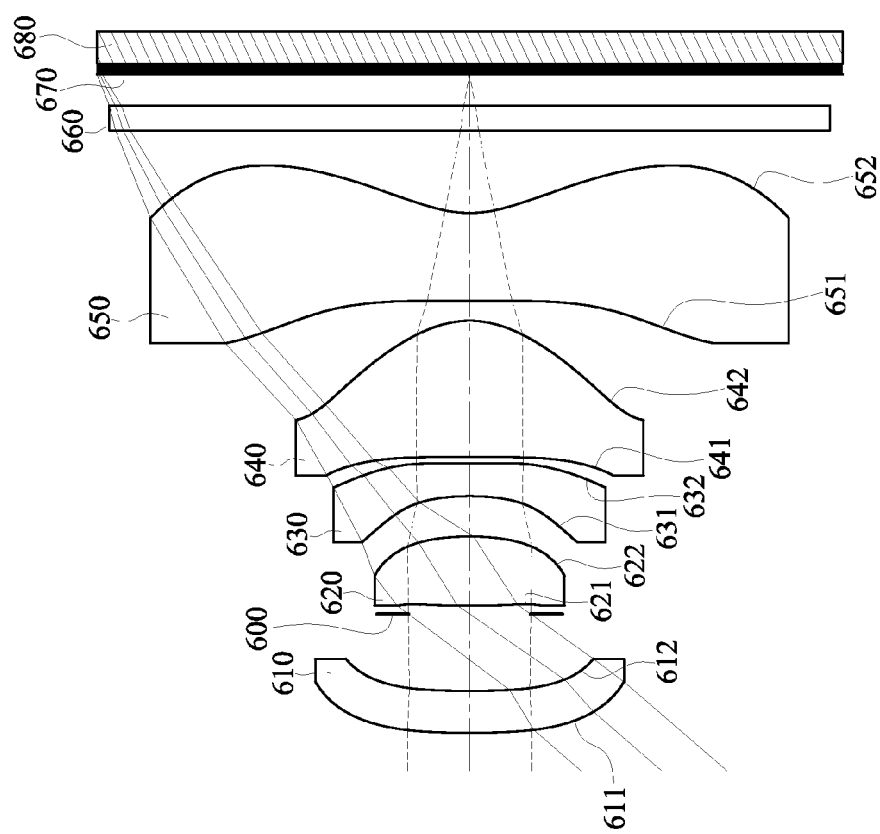
FIG. 11 is a schematic view of an image capturing unit according to the 6th embodiment of the present disclosure.
Figure 12:
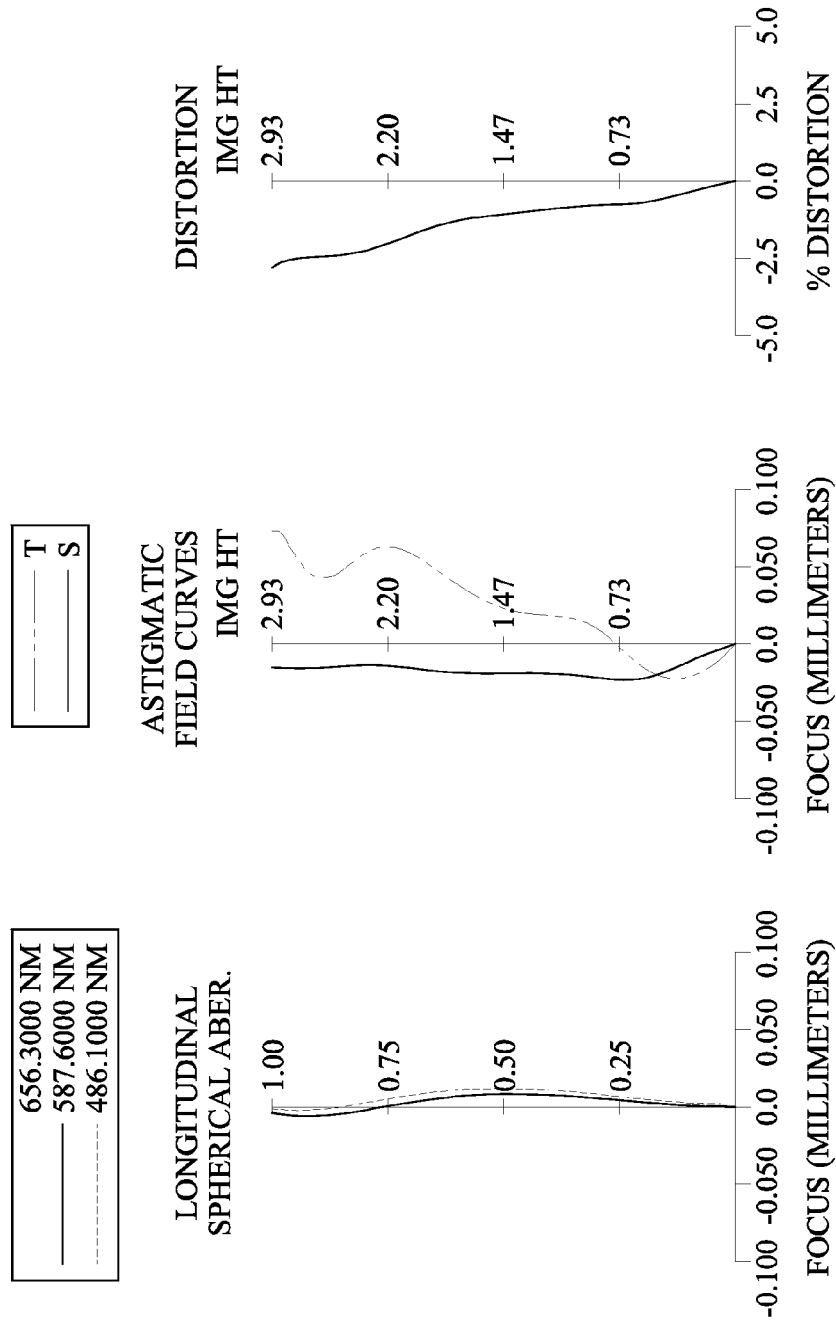
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging system (its reference numeral is omitted) of the present disclosure and an image sensor 680. The optical imaging system includes, in order from an object side to an image side, a first lens element 610, an aperture stop 600, a second lens element 620, a third lens element 630, a fourth lens element 640, a fifth lens element 650, an IR-cut filter 660 and an image surface 670, wherein the optical imaging system has a total of five lens elements (610-650) with refractive power.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being convex in a paraxial region thereof and an image-side surface 622 being convex in a paraxial region thereof. The second lens element 620 is made of plastic material and has the object-side surface 621 and the image-side surface 622 being both aspheric. The object-side surface 621 of the second lens element 620 has at least one concave shape in an off-axis region thereof.

The third lens element 630 with negative refractive power has an object-side surface 631 being concave in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has at least one convex shape in an off-axis region thereof.

The IR-cut filter 660 is made of glass and located between the fifth lens element 650 and the image surface 670, and will not affect the focal length of the optical imaging system. The image sensor 680 is disposed on or near the image surface 670 of the optical imaging system.

The detailed optical data of the 6th embodiment are shown in Table 11 and the aspheric surface data are shown in Table 12 below.

TABLE 11

6th Embodiment
f = 2.61 mm, Fno = 2.65, HFOV = 49.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.081 | (ASP) | 0.332 | Plastic | 1.639 | 23.5 | 146.24 |
| 2 | | 8.705 | (ASP) | 0.609 | | | | |
| 3 | Ape. Stop | Plano | | 0.065 | | | | |
| 4 | Lens 2 | 5.543 | (ASP) | 0.550 | Plastic | 1.544 | 55.9 | 2.86 |
| 5 | | −2.089 | (ASP) | 0.320 | | | | |
| 6 | Lens 3 | −2.171 | (ASP) | 0.260 | Plastic | 1.650 | 21.5 | −2.84 |
| 7 | | 13.039 | (ASP) | 0.050 | | | | |
| 8 | Lens 4 | −101.024 | (ASP) | 1.081 | Plastic | 1.544 | 55.9 | 1.36 |
| 9 | | −0.739 | (ASP) | 0.158 | | | | |
| 10 | Lens 5 | −98.772 | (ASP) | 0.695 | Plastic | 1.530 | 55.8 | −1.64 |
| 11 | | 0.878 | (ASP) | 0.650 | | | | |
| 12 | IR-cut filter | Plano | | 0.200 | Glass | 1.517 | 64.2 | — |
| 13 | | Plano | | 0.251 | | | | |
| 14 | Image | Plano | | — | | | | |

Note:
Reference wavelength (d-line) is 587.6 nm.

TABLE 12

Aspheric Coefficients

| Surface # | 1 | 2 | 4 | 5 | 6 |
|---|---|---|---|---|---|
| k = | 7.2570E+00 | −9.0000E+01 | −9.0000E+01 | 5.7862E+00 | −3.0929E+00 |
| A4 = | 1.2431E−01 | 2.3467E−01 | −6.3209E−02 | −2.4442E−01 | −6.5182E−01 |
| A6 = | −3.5588E−02 | −2.1516E−01 | 5.2856E−02 | 3.3241E−01 | 1.9611E−01 |
| A8 = | 1.3780E−02 | 4.5707E−01 | −1.8814E+00 | −2.2776E+00 | 6.9933E−02 |
| A10 = | 2.5570E−02 | −5.8611E−01 | 3.0844E+00 | 4.9253E+00 | 2.3126E−01 |
| A12 = | −2.5359E−02 | 4.6365E−01 | −6.3419E+00 | −4.4959E+00 | −3.6995E−02 |
| A14 = | 1.0396E−02 | −1.1850E−01 | — | — | — |

| Surface # | 7 | 8 | 9 | 10 | 11 |
|---|---|---|---|---|---|
| k = | −3.5573E+01 | −1.2339E+01 | −2.2896E+00 | 7.0620E+01 | −5.0181E+00 |
| A4 = | −3.6566E−01 | 2.5032E−03 | −9.1902E−02 | −2.2455E−02 | −6.8021E−02 |
| A6 = | 6.4669E−02 | −4.3572E−01 | 5.1264E−02 | −4.9104E−02 | 2.5305E−02 |
| A8 = | 3.3821E−01 | 9.2147E−01 | −3.3548E−02 | 3.7257E−02 | −7.3557E−03 |
| A10 = | −3.2452E−01 | −1.0510E+00 | 3.1118E−03 | −1.2332E−02 | 1.2418E−03 |
| A12 = | 9.2791E−02 | 7.2281E−01 | 1.7492E−02 | 2.3112E−03 | −1.2552E−04 |
| A14 = | — | −2.9652E−01 | −5.5857E−03 | −2.3371E−04 | 7.5364E−06 |
| A16 = | — | 5.5596E−02 | — | 9.5769E−06 | −2.2448E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.61 | CT4/(CT1 + CT3) | 1.83 |
| Fno | 2.65 | CT4/CT5 | 1.56 |
| HFOV [deg.] | 49.2 | \|f2/f1\| | 0.02 |
| tan(HFOV) | 1.16 | \|f3/f4\| + \|M/f5\| + \|f5/f3\| | 3.49 |
| V1 − V5 | −32.30 | (R5 + R6)/(R5 − R6) | −0.71 |
| T12/CT2 | 1.23 | (f/R6) − (f/R5) | 1.40 |
| T12/(T23 + T34 + T45) | 1.28 | R7/f5 | 61.60 |
| T12/T34 | 13.480 | | |

7th Embodiment

Figure 13:
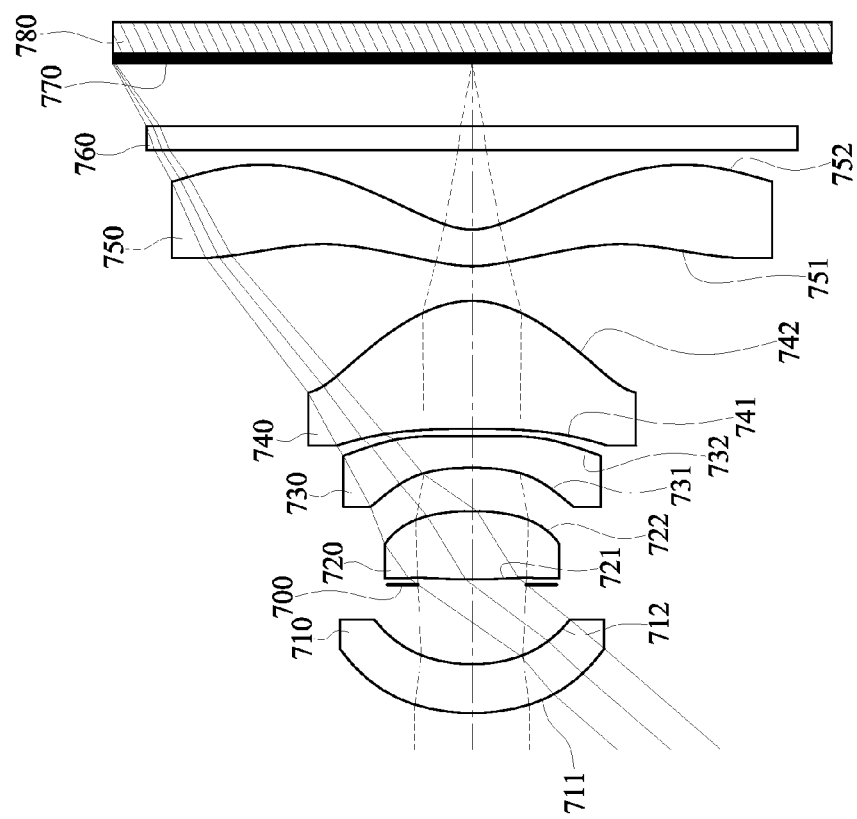
FIG. 13 is a schematic view of an image capturing unit according to the 7th embodiment of the present disclosure.
Figure 14:
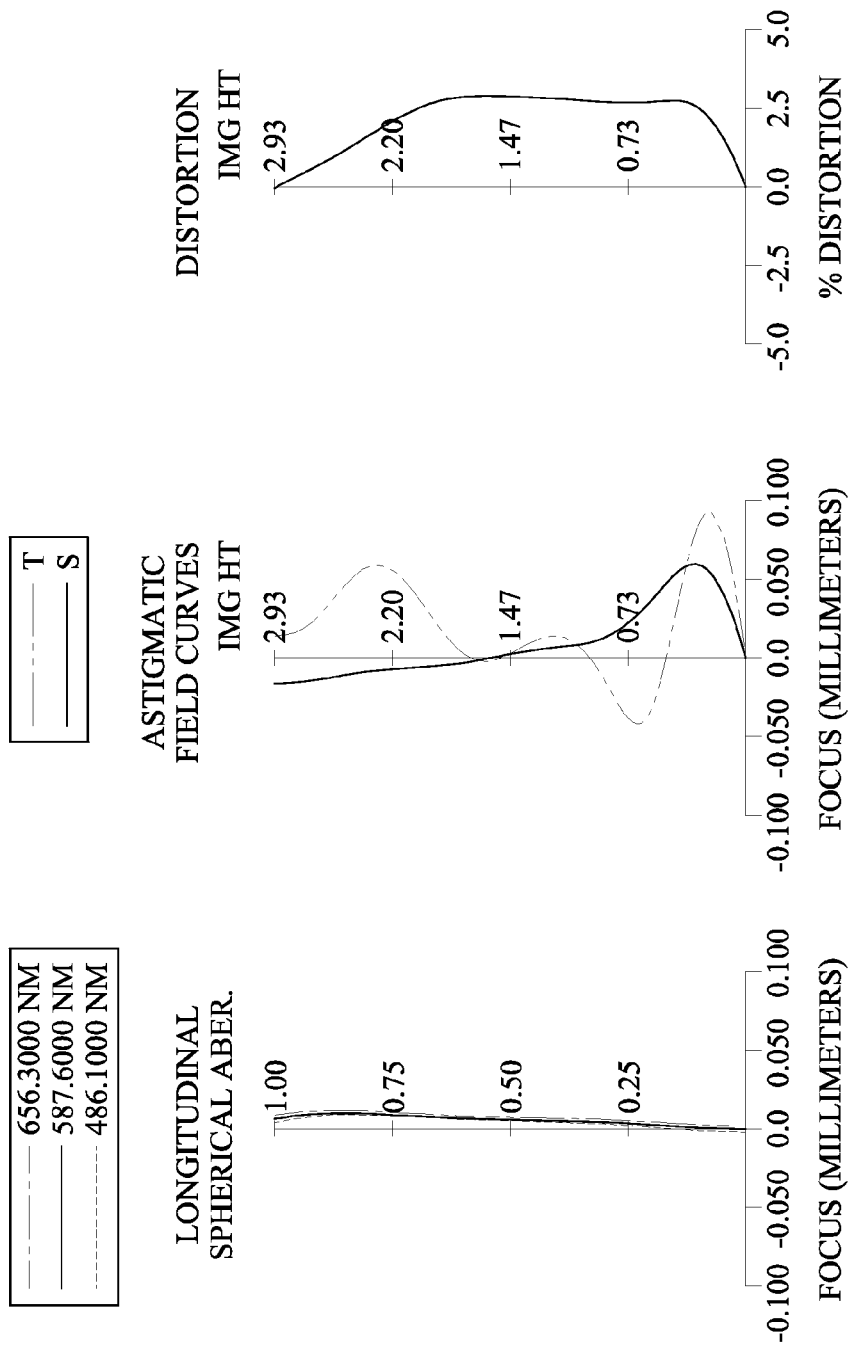
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging system (its reference numeral is omitted) of the present disclosure and an image sensor 780. The optical imaging system includes, in order from an object side to an image side, a first lens element 710, an aperture stop 700, a second lens element 720, a third lens element 730, a fourth lens element 740, a fifth lens element 750, an IR-cut filter 760 and an image surface 770, wherein the optical imaging system has a total of five lens elements (710-750) with refractive power.

The first lens element 710 with negative refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being convex in a paraxial region thereof. The second lens element 720 is made of plastic material and has the object-side surface 721 and the image-side surface 722 being both aspheric. The object-side surface 721 of the second lens element 720 has at least one concave shape in an off-axis region thereof.

The third lens element 730 with negative refractive power has an object-side surface 731 being concave in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The image-side surface 752 of the fifth lens element 750 has at least one convex shape in an off-axis region thereof.

The IR-cut filter 760 is made of glass and located between the fifth lens element 750 and the image surface 770, and will not affect the focal length of the optical imaging system. The image sensor 780 is disposed on or near the image surface 770 of the optical imaging system.

The detailed optical data of the 7th embodiment are shown in Table 13 and the aspheric surface data are shown in Table 14 below.

TABLE 13

7th Embodiment
f = 2.54 mm, Fno = 2.72, HFOV = 49.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.691 | (ASP) | 0.400 | Plastic | 1.645 | 22.5 | −12.14 |
| 2 | | 1.262 | (ASP) | 0.655 | | | | |
| 3 | Ape. Stop | Plano | | 0.040 | | | | |
| 4 | Lens 2 | 4.268 | (ASP) | 0.561 | Plastic | 1.535 | 55.7 | 2.58 |
| 5 | | −1.942 | (ASP) | 0.355 | | | | |
| 6 | Lens 3 | −2.531 | (ASP) | 0.258 | Plastic | 1.645 | 22.5 | −3.09 |
| 7 | | 9.769 | (ASP) | 0.061 | | | | |
| 8 | Lens 4 | −8.662 | (ASP) | 1.049 | Plastic | 1.535 | 55.7 | 1.53 |
| 9 | | −0.780 | (ASP) | 0.284 | | | | |
| 10 | Lens 5 | 1.028 | (ASP) | 0.300 | Plastic | 1.530 | 55.8 | −2.49 |
| 11 | | 0.519 | (ASP) | 0.650 | | | | |
| 12 | IR-cut filter | Plano | | 0.200 | Glass | 1.517 | 64.2 | — |
| 13 | | Plano | | 0.511 | | | | |
| 14 | Image | Plano | | — | | | | |

Note:
Reference wavelength (d-line) is 587.6 nm.

TABLE 14

Aspheric Coefficients

| Surface # | 1 | 2 | 4 | 5 | 6 |
|---|---|---|---|---|---|
| k = | 7.2743E−01 | −1.0592E+01 | −5.1246E+01 | 5.1342E+00 | −6.0780E+00 |
| A4 = | 7.0325E−02 | 7.0377E−01 | −7.1577E−02 | −2.6364E−01 | −6.4520E−01 |
| A6 = | −1.4392E−01 | −8.5584E−01 | −6.1543E−02 | 3.8404E−01 | 1.8960E−01 |
| A8 = | 4.7306E−01 | 1.7077E+00 | −1.8389E+00 | −2.3238E+00 | 6.4492E−02 |
| A10 = | −7.3525E−01 | −2.4752E+00 | 3.2580E+00 | 4.8876E+00 | 2.2792E−01 |
| A12 = | 5.8819E−01 | 3.3740E+00 | −6.9553E+00 | −4.5879E+00 | −3.8081E−02 |
| A14 = | −1.9058E−01 | −2.5319E+00 | — | — | — |

| Surface # | 7 | 8 | 9 | 10 | 11 |
|---|---|---|---|---|---|
| k = | −9.0000E+01 | −9.0000E+01 | −2.0953E+00 | −1.6391E+01 | −3.9902E+00 |
| A4 = | −3.6163E−01 | 1.3350E−02 | −7.8551E−02 | −1.8401E−02 | −6.3178E−02 |
| A6 = | 6.8334E−02 | −4.2883E−01 | 5.2635E−02 | −2.0312E−02 | 1.7930E−02 |
| A8 = | 3.3990E−01 | 9.2455E−01 | −3.3743E−02 | 8.8543E−03 | −4.2918E−03 |
| A10 = | −3.2355E−01 | −1.0501E+00 | 2.9426E−03 | −1.0910E−03 | 6.1881E−04 |
| A12 = | 9.3255E−02 | 7.2307E−01 | 1.7409E−02 | −4.0040E−05 | −4.3853E−05 |
| A14 = | — | −2.9634E−01 | −5.6241E−03 | 1.9963E−05 | 1.2943E−06 |
| A16 = | — | 5.5760E−02 | — | −1.2791E−06 | −1.3879E−08 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.54 | CT4/(CT1 + CT3) | 1.59 |
| Fno | 2.72 | CT4/CT5 | 3.50 |
| HFOV [deg.] | 49.1 | \|f2/f1\| | 0.21 |
| tan(HFOV) | 1.15 | \|f3/f4\| + \|f4/f5\| + \|f5/f3\| | 3.44 |
| V1 − V5 | −33.30 | (R5 + R6)/(R5 − R6) | −0.59 |
| T12/CT2 | 1.24 | (f/R6) − (f/R5) | 1.26 |
| T12/(T23 + T34 + T45) | 0.99 | R7/f5 | 3.48 |
| T12/T34 | 11.393 | | |

8th Embodiment

Figure 15:
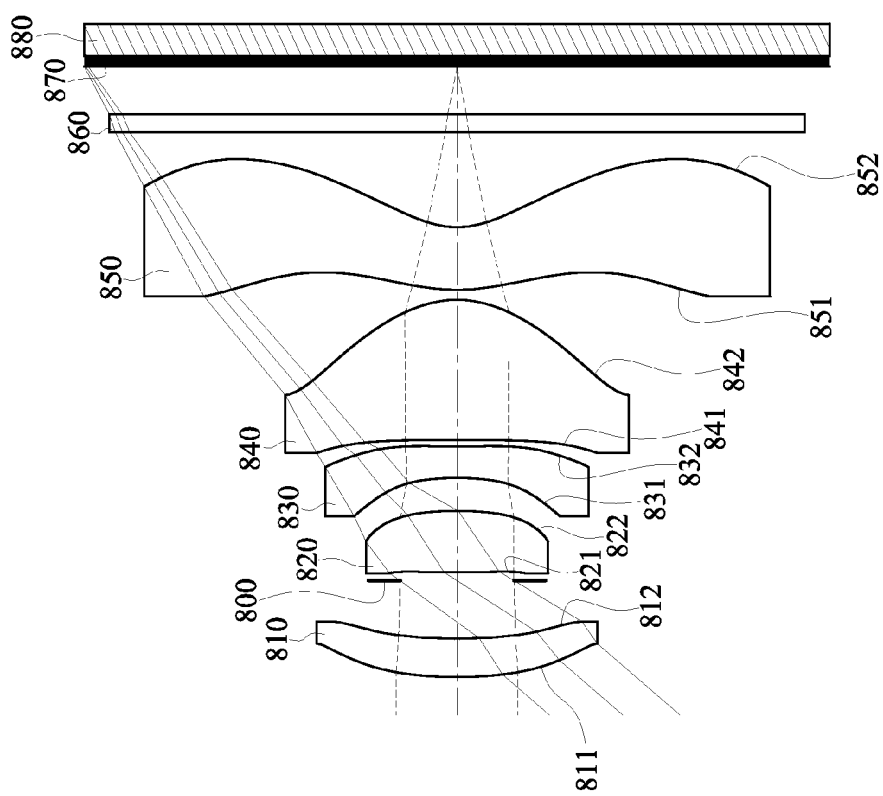
FIG. 15 is a schematic view of an image capturing unit according to the 8th embodiment of the present disclosure.
Figure 16:
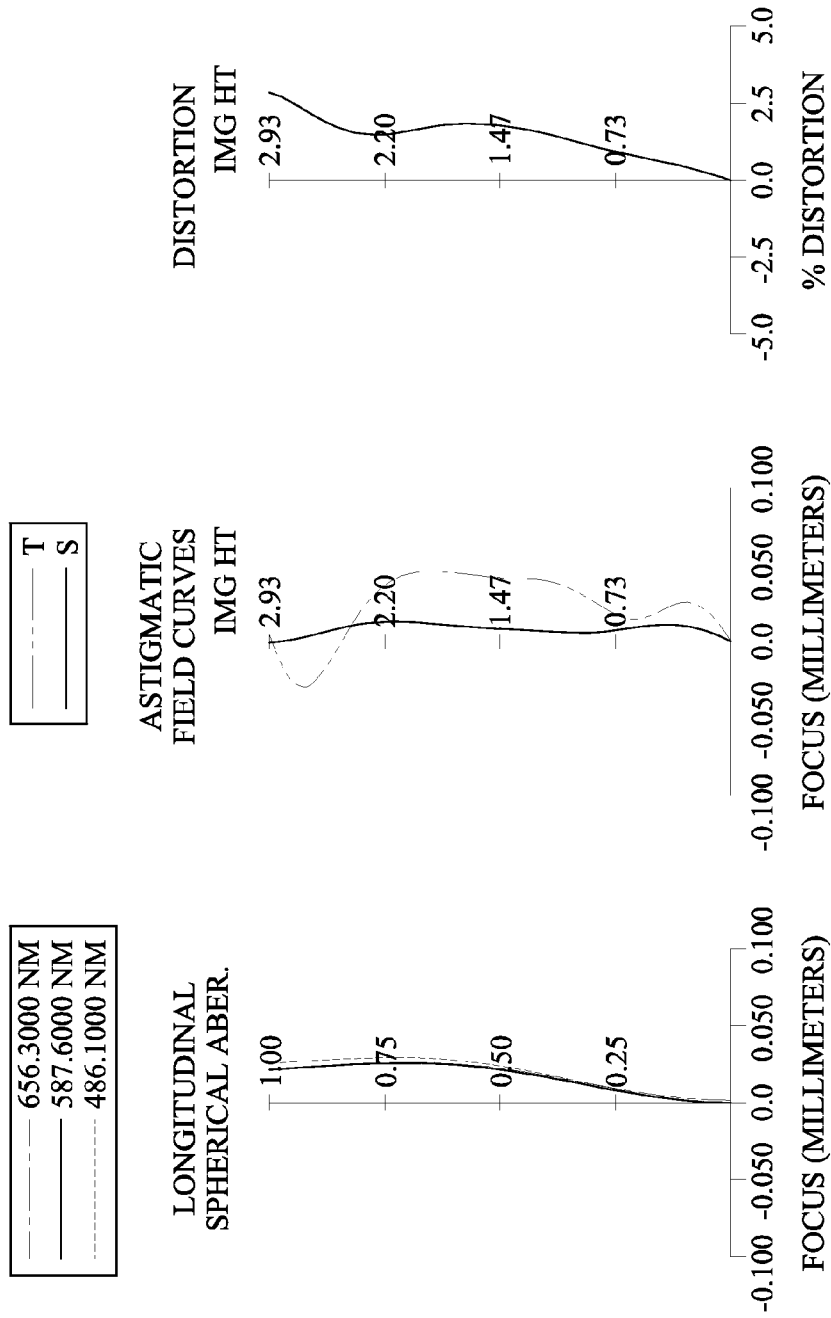
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging system (its reference numeral is omitted) of the present disclosure and an image sensor 880. The optical imaging system includes, in order from an object side to an image side, a first lens element 810, an aperture stop 800, a second lens element 820, a third lens element 830, a fourth lens element 840, a fifth lens element 850, an IR-cut filter 860 and an image surface 870, wherein the optical imaging system has a total of five lens elements (810-850) with refractive power.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being convex in a paraxial region thereof and an image-side surface 822 being convex in a paraxial region thereof. The second lens element 820 is made of plastic material and has the object-side surface 821 and the image-side surface 822 being both aspheric. The object-side surface 821 of the second lens element 820 has at least one concave shape in an off-axis region thereof.

The third lens element 830 with negative refractive power has an object-side surface 831 being concave in a paraxial region thereof and an image-side surface 832 being concave in a paraxial region thereof. The third lens element 830 is made of plastic material and has the object-side surface 831 and the image-side surface 832 being both aspheric.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has at least one convex shape in an off-axis region thereof.

The IR-cut filter 860 is made of glass and located between the fifth lens element 850 and the image surface 870, and will not affect the focal length of the optical imaging system. The image sensor 880 is disposed on or near the image surface 870 of the optical imaging system.

The detailed optical data of the 8th embodiment are shown in Table 15 and the aspheric surface data are shown in Table 16 below.

TABLE 15

8th Embodiment
f = 2.45 mm, Fno = 2.55, HFOV = 49.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.397 | (ASP) | 0.305 | Plastic | 1.550 | 56.0 | 17.16 |
| 2 | | 5.138 | (ASP) | 0.458 | | | | |
| 3 | Ape. Stop | Plano | | 0.066 | | | | |
| 4 | Lens 2 | 8.220 | (ASP) | 0.486 | Plastic | 1.550 | 56.0 | 3.98 |
| 5 | | −2.925 | (ASP) | 0.260 | | | | |
| 6 | Lens 3 | −2.653 | (ASP) | 0.250 | Plastic | 1.660 | 20.4 | −3.07 |
| 7 | | 8.925 | (ASP) | 0.050 | | | | |
| 8 | Lens 4 | −87.593 | (ASP) | 1.110 | Plastic | 1.550 | 56.0 | 1.50 |
| 9 | | −0.823 | (ASP) | 0.079 | | | | |
| 10 | Lens 5 | 1.474 | (ASP) | 0.495 | Plastic | 1.550 | 56.0 | −2.52 |
| 11 | | 0.630 | (ASP) | 0.750 | | | | |
| 12 | IR-cut filter | Plano | | 0.145 | Glass | 1.517 | 64.2 | — |
| 13 | | Plano | | 0.374 | | | | |
| 14 | Image | Plano | | — | | | | |

Note:
Reference wavelength (d-line) is 587.6 nm.

TABLE 16

Aspheric Coefficients

| Surface # | 1 | 2 | 4 | 5 | 6 |
|---|---|---|---|---|---|
| k = | 1.5618E+00 | -9.0000E+01 | -8.9972E+01 | 1.0214E+01 | -6.5947E+00 |
| A 4 = | 9.5453E-02 | 2.6335E-01 | -1.2857E-01 | -3.3123E-01 | -6.4570E-01 |
| A 6 = | -4.4304E-02 | -4.6505E-01 | -3.2195E-02 | 3.6409E-01 | 1.8845E-01 |
| A 8 = | 1.3315E-02 | 7.4553E-01 | -1.8230E+00 | -2.4590E+00 | 6.7187E-02 |
| A 10 = | 2.5906E-02 | -6.3844E-01 | 3.2605E+00 | 4.7804E+00 | 2.3120E-01 |
| A 12 = | -5.2394E-03 | 1.3396E-01 | -6.5509E+00 | -4.6620E+00 | -3.7818E-02 |
| A 14 = | -1.7463E-02 | 3.2945E-02 | — | — | — |

| Surface # | 7 | 8 | 9 | 10 | 11 |
|---|---|---|---|---|---|
| k = | 2.0233E+01 | -9.0000E+01 | -2.0618E+00 | -1.2583E+01 | -3.3360E+00 |
| A 4 = | -3.6602E-01 | 2.5011E-02 | -8.2117E-02 | -3.1621E-02 | -8.2711E-02 |
| A 6 = | 6.4707E-02 | -4.3820E-01 | 5.1590E-02 | -5.0208E-02 | 2.9035E-02 |
| A 8 = | 3.3468E-01 | 9.2061E-01 | -3.3866E-02 | 3.7204E-02 | -7.7032E-03 |
| A 10 = | -3.2778E-01 | -1.0510E+00 | 3.0042E-03 | -1.2328E-02 | 1.2562E-03 |
| A 12 = | 9.0373E-02 | 7.2308E-01 | 1.7469E-02 | 2.3143E-03 | -1.2497E-04 |
| A 14 = | — | -2.9619E-01 | -5.5871E-03 | -2.3281E-04 | 7.5543E-06 |
| A 16 = | — | 5.5842E-02 | — | 9.5769E-06 | -2.2855E-07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.45 | CT4/(CT1 + CT3) | 2.00 |
| Fno | 2.55 | CT4/CT5 | 2.24 |
| HFOV [deg.] | 49.1 | \|f2/f1\| | 0.23 |
| tan(HFOV) | 1.15 | \|f3/f4\| + \|f4/f5\| + \|f5/f3\| | 3.46 |
| V1 − V5 | 0.00 | (R5 + R6)/(R5 − R6) | -0.54 |
| T12/CT2 | 1.08 | (f/R6) − (f/R5) | 1.20 |
| T12/(T23 + T34 + T45) | 1.35 | R7/f5 | 34.76 |
| T12/T34 | 10.480 | | |

The foregoing image capturing unit is able to be installed in, but not limited to, an electronic device, including smart phones, tablet personal computers and wearable apparatus. According to the present disclosure, the optical imaging system has a total of five lens elements with refractive power. The second lens element has positive refractive power, the third lens element has negative refractive power, the fourth lens element has positive refractive power, and the fifth lens element has negative refractive power. Therefore, it is favorable for satisfying the requirements of large field of view and compact size simultaneously. When specific conditions are satisfied, it is favorable with the entrance pupil of the optical imaging system being positioned towards the image surface for enlarging the field of view and reducing the total track length of the optical imaging system. Furthermore, the image-side surface of the fifth lens element is concave in a paraxial region thereof, and the image-side surface of the fifth lens element has at least one convex shape in an off-axis region thereof. Therefore, it is favorable for correcting the distortion at the peripheral region of the image.

The foregoing description, for the purpose of explanation, has been described with reference to specific embodiments.

It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging system comprising, in order from an object side to an image side:
   a first lens element having an object-side surface being convex in a paraxial region thereof;
   a second lens element with positive refractive power having an image-side surface being convex in a paraxial region thereof, wherein at least one of an object-side surface and the image-side surface of the second lens element is aspheric;
   a third lens element with negative refractive power having an object-side surface being concave in a paraxial region thereof, wherein at least one of the object-side surface and an image-side surface of the third lens element is aspheric;
   a fourth lens element with positive refractive power having an object-side surface being concave in a paraxial region thereof and an image-side surface being convex in a paraxial region thereof, wherein at least one of the object-side surface and the image-side surface of the fourth lens element is aspheric; and
   a fifth lens element with negative refractive power having an image-side surface being concave in a paraxial region thereof, wherein the image-side surface of the fifth lens element has at least one convex shape in an off-axis region thereof, and both of an object-side surface and the image-side surface of the fifth lens element are aspheric;
   wherein the optical imaging system has a total of five lens elements, the fourth lens element has the largest central thickness among the first lens element, the second lens element, the third lens element, the fourth lens element and the fifth lens element;

wherein an axial distance between the first lens element and the second lens element is T12, a central thickness of the second lens element is CT2, a central thickness of the fourth lens element is CT4, a central thickness of the fifth lens element is CT5, a curvature radius of the object-side surface of the third lens element is R5, a curvature radius of the image-side surface of the third lens element is R6, a focal length of the first lens element is f1, a focal length of the second lens element is f2, and the following conditions are satisfied:

$1.05 < T12/CT2;$ $1.30 < CT4/CT5;$ $(R5+R6)/(R5-R6) < -0.25;$ and $|f2/f1| < 0.80.$ 2. The optical imaging system of claim 1, wherein the object-side surface of the fifth lens element is convex in a paraxial region thereof.

3. The optical imaging system of claim 2, wherein the focal length of the first lens element is f1, the focal length of the second lens element is f2, and the following condition is satisfied:

$|f2/f1| < 0.40.$

4. The optical imaging system of claim 2, wherein the curvature radius of the object-side surface of the third lens element is R5, the curvature radius of the image-side surface of the third lens element is R6, and the following condition is satisfied:

$-2.0 < (R5+R6)/(R5-R6) < -0.50.$

5. The optical imaging system of claim 2, wherein the axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following condition is satisfied:

$0.90 < T12/(T23+T34+T45) < 2.0.$

6. The optical imaging system of claim 1, wherein a projection on an optical axis from a position of a maximum effective radius of the image-side surface of the third lens element is closer to the object side than a vertex of the image-side surface of the third lens element on the optical axis.

7. The optical imaging system of claim 6, wherein the projection of the position of the maximum effective radius of the image-side surface of the third lens element on the optical axis is closer to the image side than an intersection of the object-side surface of the third lens element and the optical axis.

8. The optical imaging system of claim 1, wherein the object-side surface of the second lens element has at least one concave shape in an off-axis region thereof.

9. The optical imaging system of claim 1, wherein a focal length of the third lens element is f3, a focal length of the fourth lens element is f4, a focal length of the fifth lens element is f5, and the following condition is satisfied:

$3.0 < |f3/f4| + |f4/f5| + |f5/f3| < 3.6.$

10. The optical imaging system of claim 1, wherein a central thickness of the first lens element is CT1, a central thickness of the third lens element is CT3, the central thickness of the fourth lens element is CT4, and the following condition is satisfied:

$1.35 < CT4/(CT1+CT3) < 2.5.$

11. The optical imaging system of claim 1, wherein a curvature radius of the object-side surface of the fourth lens element is R7, a focal length of the fifth lens element is f5, and the following condition is satisfied:

$1.85 < R7/f5.$

12. The optical imaging system of claim 1, wherein half of a maximal field of view of the optical imaging system is HFOV, and the following condition is satisfied:

$0.85 < \tan(HFOV) < 1.50.$

13. The optical imaging system of claim 1, wherein an Abbe number of the first lens element is V1, an Abbe number of the fifth lens element is V5, and the following condition is satisfied:

$V1 - V5 < 10.$

14. The optical imaging system of claim 1, wherein the axial distance between the first lens element and the second lens element is T12, the central thickness of the second lens element is CT2, and the following condition is satisfied:

$1.15 < T12/CT2 < 3.5.$

15. The optical imaging system of claim 1, wherein the first lens element has positive refractive power, and the first lens element has an image-side surface being concave in a paraxial region thereof.

16. The optical imaging system of claim 13, wherein a focal length of the optical imaging system is f, the curvature radius of the object-side surface of the third lens element is R5, the curvature radius of the image-side surface of the third lens element is R6, and the following condition is satisfied:

$0.85 < (f/R6) - (f/R5) < 2.0.$

17. The optical imaging system of claim 13, wherein the axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and T12 is larger than T23, T34, or T45, and the following condition is satisfied:

$8.0 < T12/T34 < 25.0.$

18. An image capturing unit, comprising:
the optical imaging system of claim 1; and
an image sensor, wherein the image sensor is disposed on the image side of the optical imaging system.

19. An electronic device, comprising:
the image capturing unit of claim 18.

20. An optical imaging system comprising, in order from an object side to an image side:
a first lens element having an object-side surface being convex in a paraxial region thereof;
a second lens element with positive refractive power having an image-side surface being convex in a paraxial region thereof, wherein at least one of an object-side surface and the image-side surface of the second lens element is aspheric;

a third lens element with negative refractive power having an object-side surface being concave in a paraxial region thereof, wherein at least one of the object-side surface and an image-side surface of the third lens element is aspheric;

a fourth lens element with positive refractive power having an object-side surface being concave in a paraxial region thereof and an image-side surface being convex in a paraxial region thereof, wherein at least one of the object-side surface and the image-side surface of the fourth lens element is aspheric; and a fifth lens element with negative refractive power having an image-side surface being concave in a paraxial region thereof, wherein the image-side surface of the fifth lens element has at least one convex shape in an off-axis region thereof, and both of an object-side surface and the image-side surface of the fifth lens element are aspheric;

wherein the optical imaging system has a total of five lens elements, an absolute value of a focal length of the third lens element is smaller than an absolute value of a focal length of the first lens element;

wherein an axial distance between the first lens element and the second lens element is T12, a central thickness of the second lens element is CT2, a central thickness of the fourth lens element is CT4, a central thickness of the fifth lens element is CT5, a curvature radius of the object-side surface of the third lens element is R5, a curvature radius of the image-side surface of the third lens element is R6, a focal length of the first lens element is f1, a focal length of the second lens element is f2, and the following conditions are satisfied:

1.05<T12/CT2;

1.30<CT4/CT5;

(R5+R6)/(R5−R6)<−0.25; and

|f2/f1|<0.80.

21. The optical imaging system of claim 20, wherein the object-side surface of the fifth lens element is convex in a paraxial region thereof.

22. The optical imaging system of claim 21, wherein the focal length of the first lens element is f1, the focal length of the second lens element is f2, and the following condition is satisfied:

|f2/f1|<0.40.

23. The optical imaging system of claim 21, wherein the curvature radius of the object-side surface of the third lens element is R5, the curvature radius of the image-side surface of the third lens element is R6, and the following condition is satisfied:

−2.0<(R5+R6)/(R5−R6)<−0.50.

24. The optical imaging system of claim 21, wherein the fourth lens element has the largest central thickness among the first lens element, the second lens element, the third lens element, the fourth lens element and the fifth lens element.

25. The optical imaging system of claim 21, wherein the axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following condition is satisfied:

0.90<T12/(T23+T34+T45)<2.0.

26. The optical imaging system of claim 20, wherein a projection on an optical axis from a position of a maximum effective radius of the image-side surface of the third lens element is closer to the object side than a vertex of the image-side surface of the third lens element on the optical axis.

27. The optical imaging system of claim 26, wherein the projection of the position of the maximum effective radius of the image-side surface of the third lens element on the optical axis is closer to the image side than an intersection of the object-side surface of the third lens element and the optical axis.

28. The optical imaging system of claim 20, wherein the object-side surface of the second lens element has at least one concave shape in an off-axis region thereof.

29. The optical imaging system of claim 20, wherein a focal length of the third lens element is f3, a focal length of the fourth lens element is f4, a focal length of the fifth lens element is f5, and the following condition is satisfied:

3.0<|f3/f4|+|f4/f5|+|f5/f3|<3.6.

30. The optical imaging system of claim 20, wherein a central thickness of the first lens element is CT1, a central thickness of the third lens element is CT3, the central thickness of the fourth lens element is CT4, and the following condition is satisfied:

1.35<CT4/(CT1+CT3)<2.5.

31. The optical imaging system of claim 20, wherein a curvature radius of the object-side surface of the fourth lens element is R7, a focal length of the fifth lens element is f5, and the following condition is satisfied:

1.85<R7/f5.

32. The optical imaging system of claim 20, wherein half of a maximal field of view of the optical imaging system is HFOV, and the following condition is satisfied:

0.85<tan(HFOV)<1.50.

33. The optical imaging system of claim 20, wherein an Abbe number of the first lens element is V1, an Abbe number of the fifth lens element is V5, and the following condition is satisfied:

V1−V5<10.

34. The optical imaging system of claim 20, wherein the axial distance between the first lens element and the second lens element is T12, the central thickness of the second lens element is CT2, and the following condition is satisfied:

1.15<T12/CT2<3.5.

35. The optical imaging system of claim 20, wherein the first lens element has positive refractive power, and the first lens element has an image-side surface being concave in a paraxial region thereof.

36. The optical imaging system of claim 33, wherein a focal length of the optical imaging system is f, the curvature radius of the object-side surface of the third lens element is R5, the curvature radius of the image-side surface of the third lens element is R6, and the following condition is satisfied:

0.85<(f/R6)−(f/R5)<2.0.

37. The optical imaging system of claim 33, wherein the axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and T12 is larger than T23, T34, or T45, and the following condition is satisfied:

$8.0 < T12/T34 < 25.0$.

38. An image capturing unit, comprising:
the optical imaging system of claim 20; and
an image sensor, wherein the image sensor is disposed on the image side of the optical imaging system.

39. An electronic device, comprising:
the image capturing unit of claim 38.

* * * * *